United States Patent [19]

Hoshimi et al.

[11] Patent Number: 5,345,536
[45] Date of Patent: Sep. 6, 1994

[54] METHOD OF SPEECH RECOGNITION

[75] Inventors: Masakatsu Hoshimi, Sagamihara; Maki Miyata, Tokyo; Shoji Hiraoka, Kawasaki; Katsuyuki Niyada, Sagamihara, all of Japan

[73] Assignee: Matsushita Electric Industrial Co., Ltd., Osaka, Japan

[21] Appl. No.: 808,692

[22] Filed: Dec. 17, 1991

[30] Foreign Application Priority Data

| Dec. 21, 1990 | [JP] | Japan | 2-404866 |
| Jan. 25, 1991 | [JP] | Japan | 3-7477 |
| Mar. 22, 1991 | [JP] | Japan | 3-58796 |
| Jul. 11, 1991 | [JP] | Japan | 3-170908 |
| Sep. 13, 1991 | [JP] | Japan | 3-234388 |

[51] Int. Cl.$^5$ .............................................. G10L 5/06
[52] U.S. Cl. ....................................... 395/2.52; 381/41
[58] Field of Search ............................... 381/43, 42, 41

[56] References Cited

U.S. PATENT DOCUMENTS

| 4,885,791 | 12/1989 | Fuji et al. | 381/43 |
| 4,888,823 | 12/1989 | Nitta et al. | 381/43 |
| 4,991,216 | 2/1991 | Fuji et al. | 381/43 |
| 5,031,217 | 7/1991 | Nishimura | 381/43 |
| 5,131,043 | 7/1992 | Fuji et al. | 381/41 |

FOREIGN PATENT DOCUMENTS

| 0319140 | 6/1989 | European Pat. Off. |
| 0388067 | 9/1990 | European Pat. Off. |
| 0392365 | 10/1990 | European Pat. Off. |

OTHER PUBLICATIONS

Kimura et al, "A Telephone Speech Recognition System Using Word Spotting Technique Based on Statistical Measure", Proc. of ICASSP (Dallas, 1987), pp. 1175–1178.

Hiraoka et al, "A Small Vocabulary Speech Recognizer for Unspecified Speaker Using Word–Spotting Technique", *Japanese Society of Electronics, Information and Communications*, SP88–18 (1988), pp. 53–60.

*Primary Examiner*—Allen R. MacDonald
*Assistant Examiner*—Richard J. Kim
*Attorney, Agent, or Firm*—Lowe, Price, LeBlanc & Becker

[57] ABSTRACT

A set of "m" feature parameters is generated every frame from reference speech which is spoken by at least one speaker and which represents recognition-object words, where "m" denotes a preset integer. A set of "n" types of standard patterns is previously generated on the basis of speech data of a plurality of speakers, where "n" denotes a preset integer. Matching between the feature parameters of the reference speech and each of the standard patterns is executed to generate a vector of "n" reference similarities between the feature parameters of the reference speech and each of the standard patterns every frame. The reference similarity vectors of respective frames are arranged into temporal sequences corresponding to the recognition-object words respectively. The reference similarity vector sequences are previously registered as dictionary similarity vector sequences. Input speech to be recognized is analyzed to generate "m" feature parameters from the input speech. Matching between the feature parameters of the input speech and the standard patterns is executed to generate a vector of "n" input-speech similarities between the feature parameters of the input speech and the standard patterns every frame. The input-speech similarity vectors of respective frames are arranged into a temporal sequence. The input-speech similarity vector sequence is collated with the dictionary similarity vector sequences to recognize the input speech.

35 Claims, 20 Drawing Sheets

FIG. 3

| STD PATTERN / SPEECH SEG | /a/ | | | | | /k/ | | | | | | /a/ | | | | | /i/ | | | | |
|---|---|---|---|---|---|---|---|---|---|---|---|---|---|---|---|---|---|---|---|---|---|
| a | 40 | 46 | 68 | 74 | 60 | 42 | 4 | 3 | 4 | 6 | 20 | 40 | 65 | 72 | 81 | 64 | 49 | 37 | 15 | 10 | 14 | 16 |
| o | 15 | 30 | 25 | 46 | 32 | 38 | 1 | 3 | 8 | 6 | 9 | 10 | 36 | 49 | 50 | 31 | 10 | 15 | 20 | 21 | 15 | 16 |
| u | 10 | 15 | 24 | 16 | 11 | 19 | 15 | 8 | 0 | 10 | 7 | 8 | 10 | 16 | 18 | 14 | 30 | 49 | 56 | 69 | 70 | 62 |
| i | 8 | 10 | 15 | 14 | 10 | 8 | 4 | 9 | 6 | 6 | 11 | | | | | | | | | | | |
| ○ | | | | | | | 4 | | 10 | 10 | 11 | | | | | | | | | | | |
| ○ | | | | | | | | | | | | | | | | | | | | | | |
| ○ | | | | | | | | | | | | | | | | | | | | | | |
| ○ | | | | | | | | | | | | | | | | | | | | | | |
| ○ | | | | | | | | | | | | | | | | | | | | | | |
| ○ | | | | | | | | | | | | | | | | | | | | | | |
| p | | | | | | | | | | | | | | | | | | | | | | |
| t | 8 | 10 | 12 | 14 | 8 | 20 | 40 | 60 | 68 | 72 | 68 | 41 | 18 | 10 | 6 | 8 | 7 | 4 | 7 | 9 | 10 | 14 |
| k | | | | | | | | | | | | | | | | | | | | | | |

↑ SIMILARITY VECTOR

FIG. 8

| STD PATTERN \ SPEECH | /a/ | | | | | /k/ | | | | | /a/ | | | | | /i/ | | | | |
|---|---|---|---|---|---|---|---|---|---|---|---|---|---|---|---|---|---|---|---|---|
| /a/ | 1.0 | 1.0 | 1.0 | 1.0 | 1.0 | 1.0 | 0.0 | 0.0 | 0.0 | 0.7 | 1.0 | 1.0 | 1.0 | 1.0 | 0.9 | 1.0 | 0.2 | 0.3 | 0.2 | 0.3 |
| /o/ | 0.3 | 0.7 | 0.5 | 0.9 | 0.4 | 0.1 | 0.0 | 0.0 | 0.1 | 0.3 | 0.3 | 0.4 | 0.6 | 0.6 |  |  |  |  |  |  |
| /u/ | 0.2 | 0.3 | 0.1 | 0.4 | 0.0 | 0.0 | 0.0 | 0.1 | 0.0 | 0.5 | 0.2 | 0.2 | 0.2 |  |  |  |  |  |  |  |
| /i/ | 0.1 | 0.1 | 0.1 | 0.0 | 0.0 | 0.0 | 0.0 | 0.1 | 0.0 | 0.5 |  |  |  |  |  | 1.0 | 1.0 | 1.0 | 1.0 | 1.0 |
| . |  |  |  |  |  |  |  |  |  |  |  |  |  |  |  |  |  |  |  |  |
| . |  |  |  |  |  |  |  |  |  |  |  |  |  |  |  |  |  |  |  |  |
| /p/ | 0.0 | 0.0 | 0.0 | 0.0 |  |  |  |  |  |  |  |  |  |  |  |  |  |  |  |  |
| /k/ | 0.1 | 0.0 | 0.0 | 0.4 | 0.8 | 1.0 | 1.0 | 1.0 | 1.0 | 0.6 | 0.2 |  |  |  |  |  |  |  |  |  |

↑ SIMILARITY VECTOR

→ TIME (FRAME)

FIG. 17
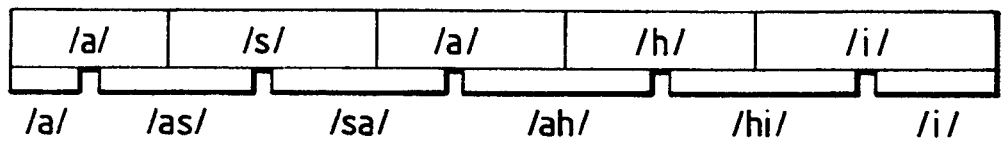
FIG. 18
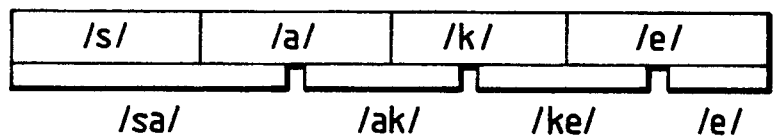
FIG. 19
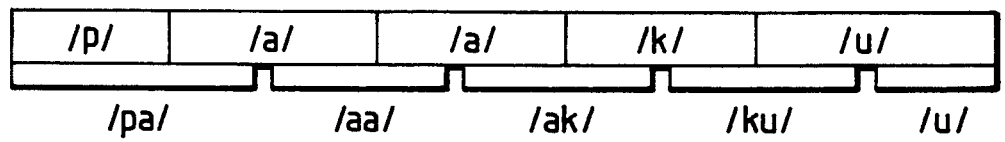
FIG. 20

METHOD OF SPEECH RECOGNITION

BACKGROUND OF THE INVENTION

1. Field of the Invention

This invention relates to a method of the recognition of speech generated from an unspecified speaker.

2. Description of the Prior Art

Some methods of speech recognition use a word spotting technique. T. Kimura et al published "A Telephone Speech Recognition System Using Word Spotting Technique Based on Statistical Measure", Proc. of ICASSP, Dallas, pp. 1175–1178, 1987. S. Hiraoka et al published "A Small Vocabulary Speech Recognizer for Unspecified Speaker Using Word-Spotting Technique", the Japanese Society of Electronics, Information and Communications, SP88-18, 1988.

According to the publication by S. Hiraoka et at, a speaker independent speech recognition method was developed which is relatively immune from noise. The recognition method named CLM (Continuous Linear Compression/Expansion Matching) uses a word spotting technique. The word spotting technique is performed by a new time normalization algorithm based on linear time distortion pattern matching method. Word recognition was carried out by using ten numeral database of 240 persons which was gathered through a telephone line. The resultant word recognition rate was 96.4%. In practical use, the recognition rate was 95.9%.

In the prior art speech recognition by S. Hiraoka et at, unknown input speech is collated with predetermined standard patterns of preset words (recognition-object words) to provide a speech recognition result. The standard patterns are generated on the basis of data of recognition-object words spoken by many speakers. During the generation of the standard patterns, signals of spoken words are visualized, and speech intervals are extracted from the visualized signals. Signal components in the speech intervals are statistically processed to form the standard patterns.

In the prior art speech recognition by S. Hiraoka et al, a word dictionary for an unspecified speaker which contains standard patterns of recognition-object words is formed by using speech data obtained from many speakers, for example, 330 speakers. Specifically, the speakers generate Japanese words representative of numerals of 1 to 10, and the generated Japanese words are converted into speech data. The speech data is visualized into spectrum waveforms, and speech intervals are extracted with observation using human eyes. Each speech interval is divided into unit analysis times. Feature parameters (LPC cepstrum coefficients) of the speech data are derived every unit analysis time. The feature parameters for the respective unit analysis times are arranged into a temporal sequence. The intervals of the speech data represented by temporal sequences of feature parameters are compressed or expanded to a preset speech time which varies from word to word. The absolute values of the resultant speech data are used to form a standard pattern of each recognition-object word.

The prior art speech recognition by S. Hiraoka et al has the following problems. First, many different speakers are necessary to generate a reliable word dictionary containing standard patterns of recognition-object words. Second, it is troublesome to change recognition-object words.

SUMMARY OF THE INVENTION

It is an object of this invention to provide an improved method of speech recognition.

A first aspect of this invention provides a method of speech recognition which comprises the steps of generating "m" feature parameters every frame from reference speech which is spoken by at least one speaker and which represents recognition-object words, where "m" denotes a preset integer; previously generating "n" types of standard patterns corresponding to a set of preset phonemes on the basis of speech data of a plurality of speakers, where "n" denotes a preset integer; executing a matching between the feature parameters of the reference speech and each of the standard patterns, and generating a vector of "n" reference similarities between the feature parameters of the reference speech and each of the standard patterns every frame; generating temporal sequences of the reference similarity vectors of respective frames, the reference similarity vector sequences corresponding to the recognition-object words respectively; previously registering the reference similarity vector sequences as dictionary similarity vector sequences; analyzing input speech to be recognized, and generating "m" feature parameters from the input speech; executing a matching between the feature parameters of the input speech and the standard patterns, and generating a vector of "n" input-speech similarities between the feature parameters of the input speech and the standard patterns every frame; generating a temporal sequence of the input-speech similarity vectors of respective frames; and collating the input-speech similarity vector sequence with the dictionary similarity vector sequences to recognize the input speech.

A second aspect of this invention provides a method of speech recognition which comprises the steps of previously setting a set of words in consideration of phonetic environments; making at least one speaker speak the word set, and obtaining "m" feature parameters therefrom every frame; previously generating "n" types of standard patterns of a set of preset phonemes from speech data generated by many speakers; executing a matching between the feature parameters and each of the standard patterns to obtain a vector of "n" similarities every frame; generating a temporal sequence pattern from the similarity vector; extracting speech fragments from the temporal sequence pattern, and registering the speech fragments as a speech fragment dictionary; generating a connection sequence of the speech fragments or a temporal sequence pattern of similarity vectors for each of speech-recognition object words, wherein the temporal sequence pattern of the similarity vectors is made by combining the speech fragments in the speech fragment dictionary: storing the connection sequence of the speech fragments or the temporal sequence pattern of the similarity vectors into a recognition-object dictionary for each of the recognition-object words; analyzing input speech to obtain "m" feature parameter every frame; executing a matching between the input-speech feature parameters and each of the standard patterns to obtain a temporal sequence of vectors of "n" similarities; and collating the input-speech temporal similarity vector sequence with each of the temporal sequence patterns of the similarities which are registered in respective items of the recognition-object dictionary to recognize the input speech, or collating the input-speech temporal similarity vector sequence with each of the temporal sequence patterns of the similarities which are generated according to the connection sequences of the speech fragments to recognize the input speech.

A third aspect of this invention provides a method of speech recognition which comprises the steps of extracting feature parameters from input speech representing one of preset words; calculating a set of input-speech similarities between the input-speech feature parameters and standard patterns of a set of preset phonemes; collating the set of the input-speech similarities with sets of predetermined reference similarities which correspond to the preset words respectively; and recognizing the input speech in response to a result of said collating step.

A fourth aspect of this invention provides a method of speech recognition which comprises the steps of extracting feature parameters front input speech representing one of preset words; calculating a set of input-speech similarities between the input-speech feature parameters and standard patterns of a set of preset phonemes: calculating a set of time-domain variations in the input-speech similarities: collating the set of the input-speech similarities with sets of predetermined reference similarities which correspond to the preset words respectively; collating the set of the time-domain variations In the input-speech similarities with sets of predetermined reference time-domain variations which correspond to the preset words respectively; and recognizing the input speech in response to results of said two collating steps.

BRIEF DESCRIPTION OF THE DRAWINGS

FIG. 3 is a diagram showing the contents of a sequence of vectors of similarities in the first embodiment.

FIG. 8 is a diagram showing the contents of a sequence of vectors of similarities in the fourth embodiment.

FIG. 17 is a time-domain diagram showing the contents of speech of a Japanese word "asahi", and consonant-vowel and vowel-consonant fragments of the speech in the tenth embodiment.

FIG. 18 is a time-domain diagram showing the contents of speech of a Japanese word "sake", and consonant-vowel and vowel-consonant fragments of the speech in the tenth embodiment.

FIG. 19 is a time-domain diagram showing the contents of speech of a Japanese word "paaku", and consonant-vowel and vowel-consonant fragments of the speech in the tenth embodiment.

FIG. 20 is a diagram showing the temporal relation between a first speech fragment and a second speech fragment generated by a first speaker and a second speaker respectively.

DESCRIPTION OF THE FIRST PREFERRED EMBODIMENT

Figure 1:
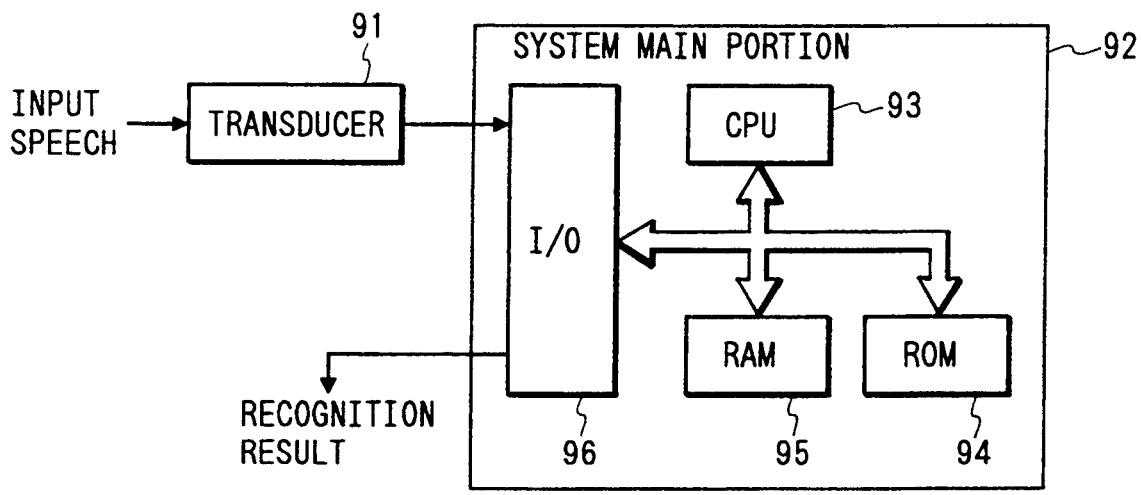
FIG. 1 is a block diagram of a speech recognition system which executes a method according to a first embodiment of this invention.

FIG. 1 shows a speech recognition system which executes a method of speech recognition according to a first embodiment of this invention. As shown in FIG. 1, the speech recognition system includes a transducer 91 and a system main portion 92. The system main portion 92 includes a microcomputer, a digital signal processor, or a similar device which has a combination of a CPU 93. a ROM 94, a RAM 95, and an input/output (I/O) section 96.

Speech generated by a speaker is converted by the transducer 91 into a corresponding electric speech signal. The speech signal is inputted into the system main portion 92, being subjected to a speech recognition process by the system main portion 92. The system main portion 92 outputs a signal representing the result of the recognition of the input speech.

Specifically, the speech signal is transmitted from the transducer 91 to the I/O section 96 of the system main portion 92. The I/O section 96 includes an analog-to-digital converter which digitizes the speech signal. The resultant digital speech signal is processed in the system main portion 92. The signal representing the result of the recognition of the input speech is outputted from the I/O section 96.

The system main portion 92 operates in accordance with a program stored in the ROM 94. The program is designed so as to execute the speech recognition process on the input speech signal.

Figure 2:
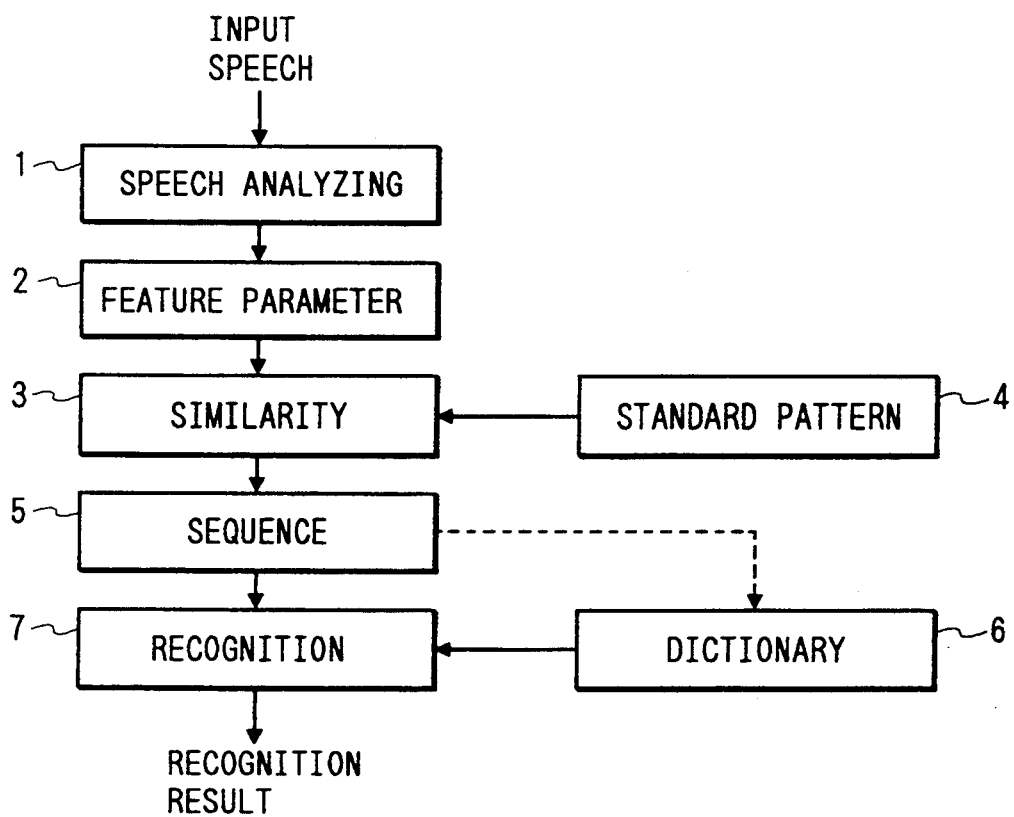
FIG. 2 is a diagram showing the flow of functions in the first embodiment.

In the field of inventions related to speech recognition systems, it is a common practice to explain the contents of the inventions with reference to diagrams of the flow of functions for an easy understanding of the inventions. It should be noted that such function flow diagrams do not directly show hardware structures. FIG. 2 is such a function flow diagram of the speech recognition system.

As shown in FIG. 2, the speech recognition system includes a speech analyzing section 1, a feature parameter extracting section 2, a similarity calculating section 3, a standard pattern store section 4, a parameter sequence generating section 5, a dictionary store section 6, and a recognition section 7.

An input speech signal is divided into time segments called frames each having a predetermined period, for example 10 msec. The input speech signal is processed frame by frame. The speech analyzing section 1 receives the input speech signal, analyzing the input speech signal and deriving linear predictor coefficients (LPC) every frame. The feature parameter extracting section 2 which follows the speech analyzing section 1 calculates feature parameters and specifically LPC cepstrum coefficients $c_0, c_1, c_2, \ldots, c_8$ from the linear predictor coefficients. The LPC cepstrum coefficients are fed from the feature parameter extracting section 2 to the similarity calculating section 3.

The standard pattern store section 4 stores standard patterns of 20 different phonemes. The phoneme standard patterns are fed from the standard pattern store section 4 to the similarity calculating section 3. The phoneme standard patterns are predetermined on the basis of speech data generated from a plurality of speakers. The phoneme standard patterns are quite different from standard patterns in the prior art speech recognition by S. Hiraoka et at. Specifically, the phoneme standard patterns relate to preset phonemes generally independent of recognition-object words, whereas the standard patterns in the prior art speech recognition correspond to recognition-object words respectively. In the case where recognition-object words are changed, it is unnecessary to change the phoneme standard patterns but the standard patterns in the prior art speech recognition need to be changed. The phoneme standard patterns are generated on the basis of speech data obtained from a large number of speakers. Also, in the prior art speech recognition, a large number of speakers are necessary to form reliable standard patterns.

The 20 different phonemes are /a/, /o/, /u/, /I/, /e/, /j/, /w/, m/, /n/, /η/, /b/, /d/, /r/, /z/, /h/, /s/, /c/, /p/, /t/, and /k/. The phoneme standard patterns are formed by visualizing speech signals representative of the respective phonemes, accurately detecting the featuring portions of the respective phonemes through observation using eyes (the featuring portions of the respective phonemes are equal to the temporal positions or frames which well represent the features of the phonemes), and using temporal patterns of feature parameters of frames centered at the featuring frames.

Specifically, with respect to each of the phonemes, temporal patterns are extracted from a plurality pieces of speech data respectively. Each temporal pattern uses a feature parameter sequence x which is composed of a linear or one-dimensional arrangement of LPC cepstrum coefficients $c_0, c_1, c_2, \ldots, c_8$ in 12 frames having 8 frames preceding a featuring frame, the featuring frame, and 3 frames following the featuring frame. The feature parameter sequence x is expressed as follows.

$$x = (c_0^{(1)}, c_1^{(1)}, \ldots, c_8^{(1)}, c_0^{(2)}, c_1^{(2)}, \ldots, \qquad (1)$$
$$c_8^{(2)}, \ldots, c_0^{(12)}, c_1^{(12)}, \ldots, c_8^{(12)})$$

where each superscript denotes a frame order number, and thus $c_i^{(k)}$ denotes the i-th LPC cepstrum coefficient in the k-th frame. Calculations are given of a vector $\mu$ of mean values of the respective elements of the extracted feature parameter sequences, and a covariance matrix $\Sigma$ between the elements. The mean value vector $\mu$ and the covariance matrix $\Sigma$ compose a standard pattern of the related phoneme. The mean value vector $\mu$ is expressed as follows.

$$\mu = (\mu_0^{(1)}, \mu_1^{(1)}, \ldots, \mu_8^{(1)}, \mu_0^{(2)}, \mu_1^{(2)}, \ldots, \qquad (2)$$
$$\mu_8^{(2)}, \ldots, \mu_0^{(12)}, \mu_1^{(12)}, \ldots, c_8^{(12)})$$

In this way, each phoneme standard pattern uses feature parameters in a plurality of frames. Thus, the phoneme standard pattern is generated in consideration of time-domain variations of the feature parameters.

The similarity calculating section 3 calculates the similarities between the feature parameters (the LPC cepstrum coefficients) of the input speech and the standard patterns of the 20 phonemes every frame. The calculation of the similarities will be explained in detail hereinafter. Maharanobis' distance dp for the calculation of the similarity between the input-speech feature parameter sequence x and the standard pattern $\mu p$ of a phoneme "p" is expressed as follows.

$$dp = (x - \mu p)^t \Sigma_p^{-1} (x - \mu p) \qquad (3)$$

where the superscript "t" denotes a transposed vector. When covariance matrixes $\Sigma p$ are in common to all the phonemes, the equation (3) is simplified as follows.

$$dp = bp - a_p \cdot x \qquad (4)$$
$$a_p = 2 \cdot \Sigma^{-1} \cdot \mu p$$
$$bp = \mu p^t \cdot \Sigma^{-1} \cdot \mu p$$

where $\Sigma$ denotes the common covariance matrix. The equations (4) are used In the similarity calculation. In the equations (4), $a_p$ and bp represent the standard pattern of the phoneme "p".

The parameter sequence generating section 5 sequentially receives the similarities from the similarity calculating section 3, and arranges the similarities into a temporal sequence of vectors of the similarities. The similarity vector sequence (referred to as the input-speech similarity vector sequence) is fed to the recognition section 7.

FIG. 3 shows an example of the similarity vector sequence which is obtained with respect to input speech representing a Japanese word "akai". In FIG. 3, the abscissa corresponds to a time direction, and the ordinate denotes the similarities obtained at respective time segments (frames). With respect to the standard pattern of the phoneme /a/, the matching is done between the input speech and the standard pattern each time the input speech is shifted by one frame, and thus a sequence of the similarities is obtained. In the example shown in FIG. 3, the obtained similarity sequence is "40, 46, 68, 74, 60, . . . , 10, 14, 16". Such a similarity sequence is obtained for each of the other 19 phonemes in a similar way. In FIG. 3, one similarity vector is denoted by the hatched region.

The dictionary store section 6 stores a dictionary containing reference similarity vector sequences which correspond to recognition-object words respectively. The reference similarity vector sequences (also referred to as the dictionary similarity vector sequences) are fed from the dictionary store section 6 to the recognition section 7. Each reference similarity vector sequence has a format similar to the format of the input-speech similarity vector sequence of FIG. 3. As will be explained later, the reference similarity vector sequences are predetermined on the basis of speech data generated from a single speaker during a preliminary process which is executed before an actual speech recognition process.

The recognition section 7 executes the matching between the input-speech similarity vector sequence and the reference similarity vector sequences, and calculates the matching scores for the reference similarity vector sequences corresponding to the recognition-object words respectively. The recognition section 7 selects the highest of the calculated matching scores, and decides a recognition result to be the recognition-object word corresponding to the highest matching score. Specifically, the matching calculation uses a DP (dynamic programming) matching technique which refers to the following recurrence formula.

$$g(i,j) = \max \begin{cases} g(i-2, j-1) + l(i,j) \\ g(i-1, j-1) + l(i,j) \\ g(i-1, j-2) + l(i, j-1) + l(i,j) \end{cases} \quad (5)$$

where max denotes the operator of selecting the maximum of members following the operator character; l(i, j) denotes the function of the distance between an i-th frame of the input-speech similarity vector sequence having a length of I frames and a j-th frame of a reference similarity vector sequence having a length of J frames; and g(i, j) denotes the accumulative similarity related to the i-th frame of the input-speech similarity vector sequence and the j-th frame of the reference similarity vector sequence.

The distance measure of the distance function l(i, j) can use the Euclidean distance measure, the weighted Euclidean distance measure, the correlation cosine distance measure, or others. In the case where the correlation cosine distance is used, the distance function l(i, j) is expressed as follows.

$$l(i,j) = \frac{a \cdot b}{|a| \cdot |b|} \quad (6)$$

where "a" denotes an input-speech similarity vector in an i-th frame which is expressed as a=(a1, a2, . . . , a20), and "b" denotes a dictionary similarity vector in a j-th frame which is expressed as b=(b1, b2, . . . , b20).

The reference similarity vector sequences, that is, the dictionary similarity vector sequences, are predetermined on the basis of speech data generated from a single speaker during a preliminary process which is executed before an actual speech recognition process. During the preliminary process, a speaker sequentially generates utterances, that is, pieces of speech, which represent preset words (recognition-object words) respectively. The pieces of the generated speech (the utterances) are sequentially inputted into the speech recognition system, and the pieces of the input speech are sequentially processed in the speech recognition system. Specifically, each piece of the input speech is processed by the sections 1-5 of FIG. 2 in a manner similar to the manner of the processing of input speech during the actual speech recognition process. As a result, the parameter sequence generating section 5 outputs the similarity vector sequence related to the processed piece of the input speech which corresponds to one of the recognition-object words. The output similarity vector sequence is registered with the dictionary in the dictionary store section 6 as a reference similarity vector sequence corresponding to the present recognition-object word. The parameter sequence generating section 5 also outputs the similarity vector sequences related to the other pieces of the input speech which correspond to the remaining recognition-object words respectively. The output similarity vector sequences are also registered with the dictionary in the dictionary store section 6 as reference similarity vector sequences corresponding to the remaining recognition-object words respectively.

Experiments were performed by using speech data which was generated from 20 speakers and which represented 212 different words for each speaker. The preliminary process was done. During the preliminary process, the speech data which was generated by one of the 20 speakers and which represented the 212 different words was inputted into the speech recognition system and was processed in the speech recognition system, so that reference similarity vector sequences corresponding to the 212 different words respectively were generated on the basis of the speech data. After the preliminary process, the actual speech recognition process was executed. During the actual speech recognition process, the speech data which was generated by the other 19 speakers and which represented the 212 different words for each speaker was inputted into the speech recognition system and was subjected to speech recognition. Good recognition results were obtained at a rate of 88.7%.

DESCRIPTION OF THE SECOND PREFERRED EMBODIMENT

Figure 4:
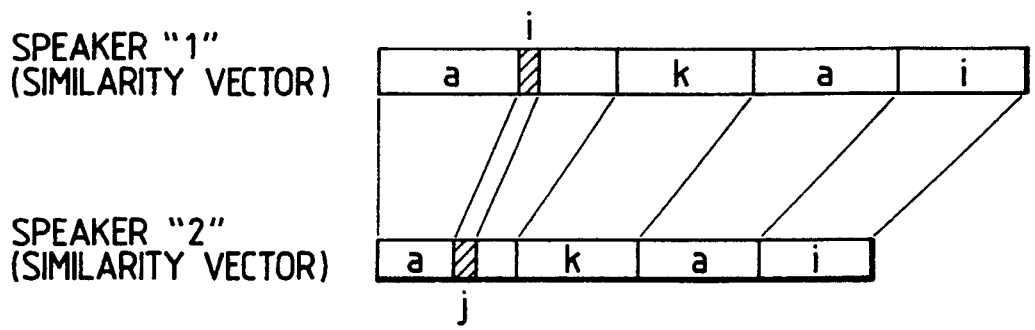
FIG. 4 is a diagram showing the temporal relation between first speech and second speech generated by a first speaker and a second speaker respectively.

A second embodiment of this invention is similar to the embodiment of FIGS. 1-3 except for design changes indicated hereinafter. Reference similarity vector sequences, that is, dictionary similarity vector sequences, are predetermined on the basis of speech data generated from two speakers "1" and "2" during a preliminary process which is executed before an actual speech recognition process. During the preliminary process, the first speaker "1" and the second speaker "2" sequentially generate pieces of speeches which represent a first preset word (a first recognition-object word). The piece of the generated speech by the first speaker "1" and the piece of the generated by the second speaker "2" are sequentially inputted into the speech recognition system, and the pieces of the input speeches are sequentially processed in the speech recognition system. The piece of the speech by the first speaker "1" and the piece of the speech by the second speaker "2" are equalized in period by using a DP matching technique. For example, as shown in FIG. 4, the period of the Japanese word "akai" generated by the first speaker "1" is different from the period of the same Japanese word generated by the second speaker "2". The period equalization makes it possible that the periods of the phonemes /a/, /k/, /a/, and /i/ by the first speaker "1" match to the periods of the same phonemes by the second speaker "2" respectively. A parameter sequence generating section 5 (see FIG. 2) generates a similarity vector for each frame in relation to the speech by the first speaker "1". In addition, the parameter sequence generating section 5 generates a similarity vector for each frame in relation to the speech by the second speaker "2". For each pair of corresponding frames of the speech by the first speaker "1" and the speech by the second speaker "2", a similarity vector related to the first speaker "1 and a similarity vector related to the second speaker "2" are averaged into a mean similarity vector. For example, in the case where the i-th frame of the speech by the first speaker "1" corresponds to the J-th frame of the speech by the second speaker "2" as shown in FIG. 4, when the similarity vector of the i-th frame of the speech by the first speaker "1" is represented as "c=(c1, c2, ..., c20) and the similarity vector of the corresponding j-th frame of the speech by the second speaker "2" is represented as "e=(e1, e2, ..., e20)", the averaging calculation generates the mean similarity vector which is given as "f=((c1+e1)/2, (c2+e2)/2, ..., (c20+e20)/2)". The mean similarity vectors of the respective frames compose a mean similarity vector sequence related to the first present word (the first recognition-object word). The mean similarity vector sequence related to the first recognition-object word is registered with a dictionary in a dictionary store section 6 (see FIG. 2) as a reference similarity vector sequence. Similar process are executed for each of the other recognition-object words. Thus, the parameter sequence generating section 5 also outputs mean similarity vector sequences corresponding to the other recognition-object words respectively. These output mean similarity vector sequences are also registered with the dictionary in the dictionary store section 6 as reference similarity vector sequences corresponding to the other recognition-object words respectively.

Experiments similar to the experiments in the embodiment of FIGS. 1-3 were done. According to the experiments, in the second embodiment, good recognition results were obtained at a rate of 93.4%.

It should be noted that reference similarity vector sequences may be generated on the basis of speech data generated from three or more different speakers. In this case, an averaging calculation similar to the previously-mentioned averaging calculation is done repeatedly.

It should be noted that multi-sets of reference similarity vector sequences may be used. In this case, a set of reference similarity vector sequences is generated on the basis of speech data generated from each of two or more different speakers. In this case, good recognition results were obtained at a rate of 93.2% according to experiments.

DESCRIPTION OF THE THIRD PREFERRED EMBODIMENT

Figure 5:
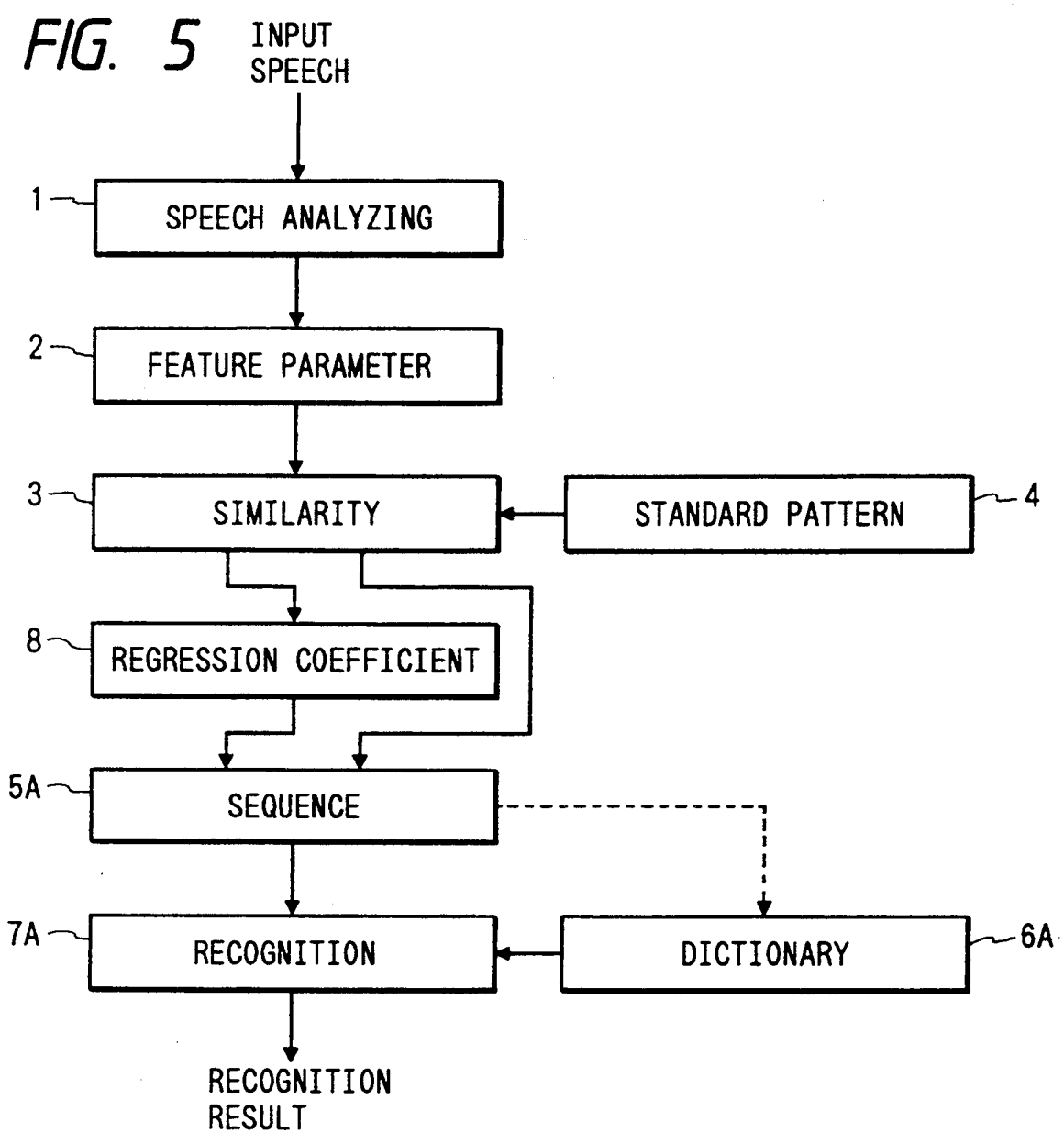
FIG. 5 is a diagram showing the flow of functions in a speech recognition method according to a third embodiment of this invention.

FIG. 5 relates to a third embodiment of this invention which is similar to the embodiment of FIGS. 1-3 except for design changes indicated hereinafter.

As shown in FIG. 5, a speech recognition system includes a speech analyzing section 1, a feature parameter extracting section 2, a similarity calculating section 3, a standard pattern store section 4, a parameter sequence generating section 5A, a dictionary store section 6A, a recognition section 7A, and a regression coefficient calculating section 8. The speech analyzing section 1, the feature parameter extracting section 2, the similarity calculating section 3, and the standard pattern store section 4 are similar to those of FIG. 2.

The regression coefficient calculating section 8 sequentially receives similarities from the similarity calculating section 3. The regression coefficient calculating section 8 calculates regression coefficients which correspond to temporal variations of the similarities. The total number of the regression coefficients is equal to "n" per similarity sequence. Specifically, a regression coefficient of a present frame agrees with the slope of a least-square approximation straight line with respect to the similarities of two frames preceding the present frame, the similarity of the present frame, and the similarities of two frames following the present frame.

Figure 6:
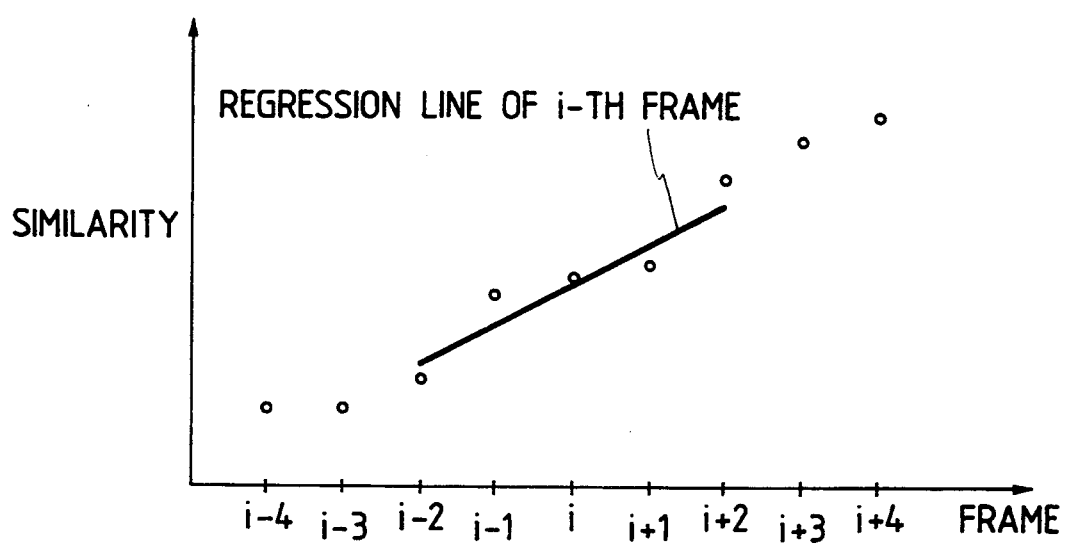
FIG. 6 is a diagram showing similarities of respective frames and a straight line corresponding to a similarity regression coefficient of a frame in the third embodiment.

As in the embodiment of FIGS. 1-3, the similarity calculating section 3 calculates the similarity between the input-speech feature parameters and each standard pattern each time the input speech is shifted by one frame. As a result, a temporal sequence of the similarities is obtained for each phoneme standard pattern. FIG. 6 shows an example of the similarity sequence, in which the abscissa denotes a frame (a frame order number) and the ordinate denotes the magnitude of a similarity. As shown in FIG. 6, an assumed straight line with respect to the similarities of an (i−2)-th frame to (i+2)-th frame is determined by the regression coefficient calculating section 8 on the basis of least square approximation, and the slope of the straight line is set as the time-domain variation (the regression coefficient) of the i-th frame. Specifically, the regression coefficient "a" is calculated by referring to the following equation.

$$a = \left\{ 5 \cdot \sum_{i=1}^{5} i \cdot x_i - \sum_{i=1}^{5} i + \sum_{i=1}^{5} x_i \right\} / \left\{ 5 \cdot \sum_{i=1}^{5} i^2 - \left( \sum_{i=1}^{5} i \right)^2 \right\} \quad (7)$$

where $x_i$ denotes the similarity of an i-th frame.

The parameter sequence generating section 5A sequentially receives the regression coefficients from the regression coefficient calculating section 8, and manges the regression coefficients into a temporal sequence of vectors of the regression coefficients. In addition, the parameter sequence generating section 5A sequentially receives the similarities from the similarity calculating section 3, and arranges the similarities Into a temporal sequence of vectors of the similarities. The regression coefficient vector sequence and the similarity vector sequence (referred to as the input-speech similarity vector sequence) are fed to the recognition section 7A.

The dictionary store section 6A stores a dictionary which contains reference similarity vector sequences corresponding to recognition-object words respectively, and also which contains reference regression coefficient vector sequences corresponding to the recognition-object words respectively. The reference similarity vector sequences (also referred to as the dictionary similarity vector sequences) and the reference regression coefficient vector sequences (also referred to as the dictionary regression coefficient vector sequences) are fed from the dictionary store section 6A to the recognition section 7A. As will be explained later, the reference similarity vector sequences and the reference regression coefficients vector sequences are predetermined on the basis of speech data generated from a single speaker during a preliminary process which is executed before an actual speech recognition process.

The recognition section 7A executes the matching between a set of the input-speech similarity vector sequence and the input-speech regression coefficient vector sequence and sets of the reference similarity vector sequences and the reference regression coefficient vector sequences, and calculates the matching scores for the sets of the reference similarity vector sequences and the reference regression coefficient vector sequences which correspond to the recognition-object words respectively. The recognition section 7A selects the highest of the calculated matching scores, and decides a recognition result to be the recognition-object word corresponding to the highest matching score. Specifically, the matching calculation uses a DP matching technique as in the embodiment of FIGS. 1-3. In the case where a correlation cosine distance is used as a measure during the matching calculation, the distance function l(i, j) is expressed as follows.

$$l(i,j) = w \frac{a \cdot b}{|a| \cdot |b|} + (1 - w) \frac{c \cdot d}{|c| \cdot |d|} \qquad (8)$$

where "a" denotes an input-speech similarity vector in an i-th frame which is expressed as $a = (a1, a2, \ldots, a20)$; "b" denotes a dictionary similarity vector in a j-th frame which is expressed as $b = (b1, b2, \ldots, b20)$; "c" denotes an input-speech regression coefficient vector in an i-th frame which is expressed as $c = (c1, c2, \ldots, c20)$; "d" denotes a dictionary regression coefficient vector in a j-th frame which is expressed as $d = (d1, d2, \ldots, d20)$; and "w" denotes a weight which agrees with a predetermined ratio of mixing the similarity part and the regression coefficient part. It is preferable that the mixing ratio is in the range of 0.4 to 0.6.

The reference similarity vector sequences (the dictionary similarity vector sequences) and the reference regression coefficient vector sequences (the dictionary regression coefficient vector sequences) are predetermined on the basis of speech data generated from a single speaker during a preliminary process which is executed before an actual speech recognition process. During the preliminary process, a speaker generates pieces of speech which represent preset words (recognition-object words) respectively. The pieces of the generated speech are sequentially inputted into the speech recognition system, and the pieces of the input speech are sequentially processed in the speech recognition system. Specifically, each piece of the input speech is processed by the sections 1-4, 5A, and 8 of FIG. 5 in a manner similar to the manner of the processing of input speech during the actual speech recognition process. As a result, the parameter sequence generating section 5A outputs a set of the similarity vector sequence and the regression coefficient vector sequence related to the processed piece of the input speech which corresponds to one of the recognition-object words. The output similarity vector sequence and the output regression coefficient vector sequence are registered with the dictionary in the dictionary store section 6A as a reference similarity vector sequence and a reference regression coefficient vector sequence corresponding to the present recognition-object word. The parameter sequence generating section 5A also outputs sets of the similarity vector sequences and the regression coefficient vector sequences related to the other pieces of the input speech which corresponding to the remaining recognition-object words respectively. The output similarity vector sequences and the output regression coefficient vector sequences are also registered with the dictionary in the dictionary store section 6A as reference similarity vector sequences and reference regression coefficient vector sequences corresponding to the remaining recognition-object words respectively.

Experiments were performed by using speech data which was generated from 20 speakers and which represented 212 different words for each speaker. The preliminary process was done. During the preliminary process, the speech data which was generated by one of the 20 speakers and which represented the 212 different words was inputted into the speech recognition system and was processed in the speech recognition system, so that reference similarity vector sequences and reference regression coefficient vector sequences corresponding to the 212 different words respectively were generated on the basis of the speech data. After the preliminary process, the actual speech recognition process was executed. During the actual speech recognition process, the speech data which was generated by the other 19 speakers and which represented the 212 different words for each speaker was inputted into the speech recognition system and was subjected to speech recognition. Good recognition results were obtained at a rate of 91.8%.

Reference similarity vector sequences (dictionary similarity vector sequences) and reference regression coefficient vector sequences (dictionary regression coefficient vector sequences) may be determined through an averaging calculation on the basis of speech data generated from two speakers as in the second embodiment. In this case, good recognition results were obtained at a rate of 95.9% according to experiments.

DESCRIPTION OF THE FOURTH PREFERRED EMBODIMENT

Figure 7:
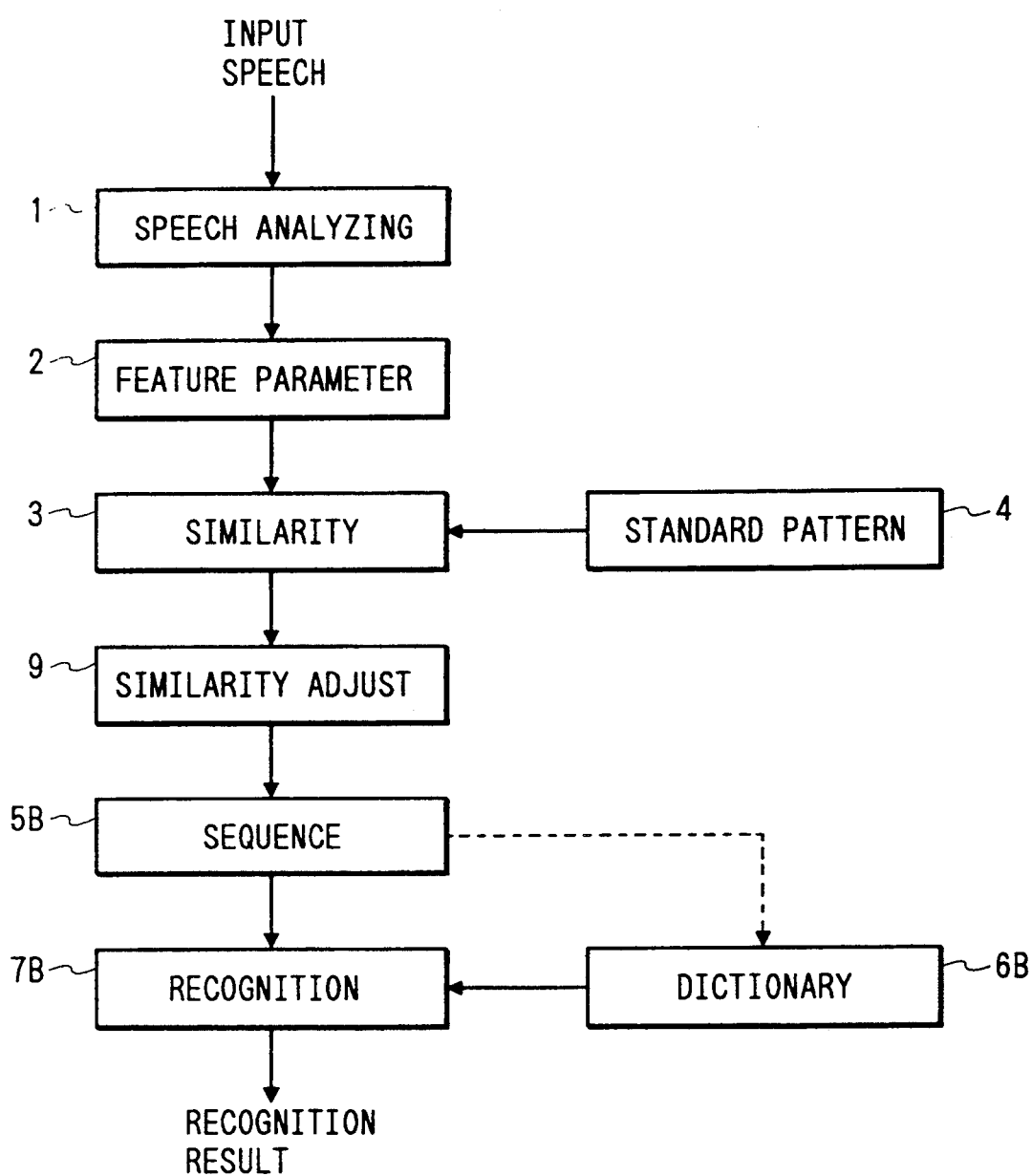
FIG. 7 is a diagram showing the flow of functions in a speech recognition method according to a fourth embodiment of this invention.

FIG. 7 relates to a fourth embodiment of this invention which is similar to the embodiment of FIGS. 1-3 except for design changes indicated hereinafter.

As shown in FIG. 7, a speech recognition system includes a speech analyzing section 1, a feature parameter extracting section 2, a similarity calculating section 3, a standard pattern store section 4, a parameter sequence generating section 5B, a dictionary store section 6B, a recognition section 7B, and a similarity adjusting section 9. The speech analyzing section 1, the feature parameter extracting section 2, the similarity calculating section 3, and the standard pattern store section 4 are similar to those of FIG. 2.

The similarity adjusting section 9 sequentially receives 20 similarities, which correspond to 20 recognition-object words respectively, from the similarity calculating section 3 every frame, and rearranges the similarities into a vector form. In each similarity vector, the similarities are arranged according to magnitude. The similarities in each similarity vector are subjected to an emphasizing process so that the similarity vector are converted into a second similarity vector. During the emphasizing process, the first greatest similarity to the k-th greatest similarity are linearly converted to 1 to 0 respectively. Thus, the first greatest similarity is converted to 1, and the k-th greatest similarity is converted to 0. The second greatest similarity to the (k−1)-th greatest similarity are linearly converted to values between 1 to 0. The (k+1)-th greatest similarity to the smallest similarity are set to 0. Specifically, the components $F(a_i)$ of a second similarity vector (i=1, 2, ..., 20) are expressed as follows.

$$F(a_i) = \frac{1}{M - Mk} a_i - \frac{Mk}{M - Mk} \text{ (the first to the } k\text{-th greatest components)}$$ (9)

$F(a_i) = 0$ (the $(k + 1)$-th greatest to the smallest components)

where $a_i$ denotes an i-th component of the original similarity vector, and M denotes the greatest of the similarities and Mk denotes the k-th greatest similarity. In this way, greater similarities in each original similarity vector are emphasized relative to the remaining similarities according to the emphasizing functions (9). Since the values M and Mk depend on frame, a second similarity vector depends on frame. The maximum component and the minimum component are equal to 1 and 0 respectively in each second similarity vector corresponding to a frame. Thus, second similarity vectors are normalized frame by frame. In general, since phoneme standard patterns in the standard pattern store section 4 are generated from temporal patterns of feature parameters in and around a featuring frame, original similarities tend to be small in a part of the input speech which corresponds to a transition between phonemes. The previously-mentioned normalization prevents an underestimation of a feature in the relation between similarities which would be caused by small original similarities in an input speech part corresponding to a transition between phonemes.

The parameter sequence generating section 5B sequentially receives the second similarities from the similarity calculating section 3, and arranges the received similarities into a temporal sequence of vectors of the similarities. The similarity vector sequence (referred to as the input-speech similarity vector sequence) is fed to the recognition section 7B.

Figure 9:
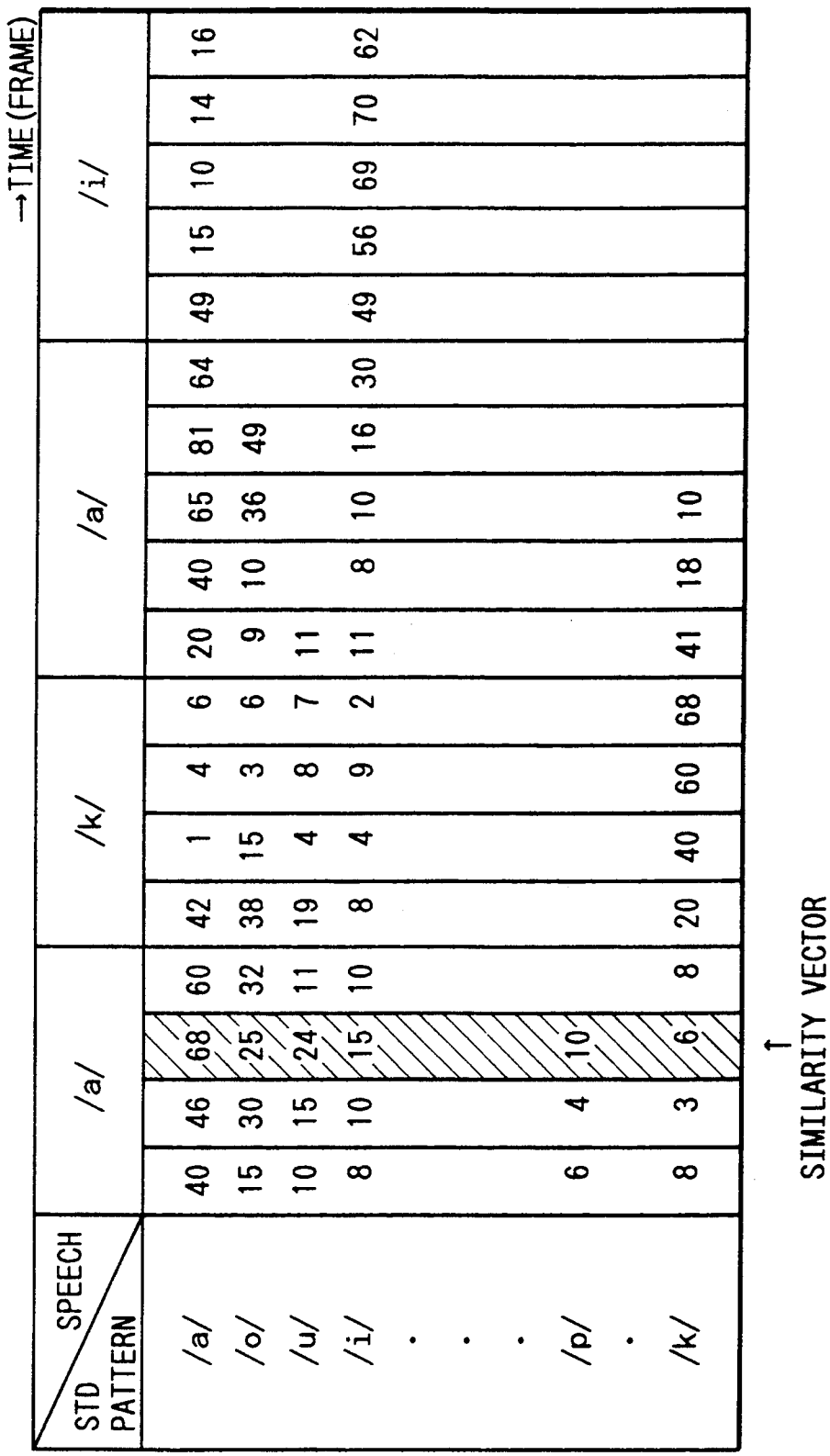
FIG. 9 is it diagram showing the contents of a sequence of vectors of similarities which corresponds to the similarity vector sequence of FIG. 8.

FIG. 8 shows an example of the similarity vector sequence which is obtained with respect to input speech representing a Japanese word "akai". In FIG. 8, the abscissa corresponds to a time direction, and the ordinate denotes the similarities obtained at respective time segments (frames). With respect to the standard pattern of tile phoneme /a/, the matching is done between the input speech and tile standard pattern each time the input speech is shifted by one frame, and thus a sequence of the similarities is obtained. In the example shown in FIG. 8, the obtained similarity sequence is "1.0, 1.0, 1.0, 1.0, 1.0, 0.0, . . . , 0.3, 0.2, 0.3". Such a similarity sequence is obtained for each of the other 19 phonemes in a similar way. In FIG. 8, one similarity vector is denoted by the hatched region. To make clear the effects of the emphasizing process and the normalizing processes by the similarity adjusting section 9, FIG. 9 shows a similarity vector sequence which corresponds to the similarity vector sequence of FIG. 8 and which is obtained without the emphasizing process and the normalizing process, The dictionary store section 6A stores a dictionary containing reference similarity vector sequences which correspond to recognition-object words respectively. The reference similarity vector sequences (also referred to as the dictionary similarity vector sequences) are fed from the dictionary store section 6A to the recognition section 7A. Each reference similarity vector sequence has a format similar to the format of the input-speech similarity vector sequence of FIG. 8, As will be explained later, the reference similarity vector sequences are predetermined on the basis of speech data generated from a single speaker during a preliminary process which is executed before an actual speech recognition process.

The recognition section 7A executes the matching between the input-speech similarity vector sequence and the reference similarity vector sequences, and calculates the matching scores for the reference similarity vector sequences corresponding to the recognition-object words respectively. The recognition section 7A selects the highest of the calculated matching scores, and decides a recognition result to be tile recognition-object word corresponding to the highest matching score. Specifically, the matching calculation uses a DP (dynamic programming) matching technique which refers to the following recurrence formula.

$$g(i, j) = \max \begin{cases} g(i - 2, j - 1) + l(i, j) \\ g(i - 1, j - 1) + l(i, j) \\ g(i - 1, j - 2) + l(i, j - 1) + l(i, j) \end{cases}$$ (10)

where max denotes the operator of selecting the maximum of members following the operator character; l(i, j) denotes the function of the distance between an i-th frame of the input-speech similarity vector sequence having a length of I frames and a j-th frame of a reference similarity vector sequence having a length of J frames; and g(i, j) denotes the accumulative similarity related to the i-th frame of the input-speech similarity vector sequence and the j-th frame of the reference similarity vector sequence.

The distance measure of the distance function l(i, j) can use the Euclidean distance measure, the weighted Euclidean distance measure, the correlation cosine distance measure, or others. In the case where the Euclidean distance is used, the distance function l(i, j) is expressed as follows.

$$l(i, j) = \sqrt{(a1 - b1)^2 + (a2 - b2)^2 + \ldots + (a20 - b20)^2}$$ (11)

where a1, a2, . . . , a20 denote components of an input-speech similarity vector "a" in an i-th frame which is expressed as a=(a1, a2, . . . , a20), and b1, b2, . . . , b20 denote components of a dictionary similarity vector "b" in a j-th frame which is expressed as b=(b1, b2, . . . , b20).

The reference similarity vector sequences, that is, the dictionary similarity vector sequences, are predetermined on the basis of speech data generated from a single speaker during a preliminary process which is executed before an actual speech recognition process. During the preliminary process, a speaker generates pieces of speech which represent preset words (recognition-object words) respectively. The pieces of the generated speech are sequentially inputted into the speech recognition system, and the pieces of the input speech are sequentially processed in the speech recognition system. Specifically, each piece of the input speech is processed by the sections 1–4, 5B, and 9 of FIG. 7 in a manner similar to the manner of the processing of input speech during the actual speech recognition process. As a result, the parameter sequence generating section 5B outputs the similarity vector sequence related to the processed piece of the input speech which corresponds to one of the recognition-object words. The output similarity vector sequence is registered with the dictionary in the dictionary store section 6B as a reference similarity vector sequence corresponding to the present recognition-object word. The parameter sequence generating section 5B also outputs the similarity vector sequences related to the other pieces of the input speech which correspond to the remaining recognition-object words respectively. The output similarity vector sequences are also registered with the dictionary in the dictionary store section 6B as reference similarity vector sequences corresponding to the remaining recognition-object words respectively.

Experiments were performed by using speech data which was generated from 20 speakers and which represented 212 different words for each speaker. The preliminary process was done. During the preliminary process, the speech data Which was generated by one of the 20 speakers and which represented the 212 different words was inputted into the speech recognition system and was processed in the speech recognition system, so that reference similarity vector sequences corresponding to the 212 different words respectively were generated on the basis of the speech data. After the preliminary process, the actual speech recognition process was executed. During the actual speech recognition process, the speech data which was generated by the other 19 speakers and which represented the 212 different words for each speaker was inputted into the speech recognition system and was subjected to speech recognition. Good recognition results were obtained at a rate of 88.5%.

DESCRIPTION OF THE FIFTH PREFERRED EMBODIMENT

A fifth embodiment of this invention is similar to the embodiment of FIGS. 7–8 except for design changes indicated hereinafter. Reference similarity vector sequences, that is, dictionary similarity vector sequences, are predetermined on the basis of speech data generated from two speakers "1" and "2" during a preliminary process which is executed before an actual speech recognition process. During the preliminary process, the first speaker "1" and the second speaker "2" sequentially generate pieces of speeches which represent a first preset word (a first recognition-object word). The piece of tile generated speech by the first speaker "1" and the piece of the generated by the second speaker "2" are sequentially inputted into the speech recognition system, and the pieces of the input speeches are sequentially processed in the speech recognition system. The piece of the speech by the first speaker "1" and the piece of the speech by the second speaker "2" are equalized In period by using a DP matching technique. For example, as shown In FIG. 4, the period of the Japanese word "akai" generated by the first speaker "1" is different from the period of the same Japanese word generated by the second speaker "2". The period equalization makes it possible that the periods of the phonemes /a/, /k/, /a/, and /i/ by the first speaker "1" match to the periods of the same phonemes by the second speaker "2" respectively. A parameter sequence generating section 5B (see FIG. 7) generates a similarity vector for each frame in relation to the speech by the first speaker "1". In addition, the parameter sequence generating section 5B generates a similarity vector for each frame in relation to the speech by the second speaker "2". For each pair of corresponding frames of the speech by the first speaker "1" and the speech by the second speaker "2", a similarity vector related to the first speaker "1 and a similarity vector related to the second speaker "2" are averaged into a mean similarity vector. For example, in the case where the i-th frame of the speech by the first speaker "1" corresponds to the j-th frame of the speech by the second speaker "2" as shown in FIG. 4, when the similarity vector of the i-th frame of tile speech by the first speaker "1" is represented as "$c=(c_1, c_2, \ldots, c_{20})$" and the similarity vector of the corresponding j-th frame of the speech by the second speaker "2" is represented as "$e=(e_1, e_2, \ldots, e_{20})$", the averaging calculation generates the mean similarity vector which is given as "$f=((c_1+e_1)/2, (c_2+e_2)/2, \ldots, (c_{20}+e_{20})/2)$". The mean similarity vectors of the respective frames compose a mean similarity vector sequence related to the first present word (the first recognition-object word). The mean similarity vector sequence related to the first recognition-object word is registered with a dictionary in a dictionary store section 6B (see FIG. 7) as a reference similarity vector sequence. Similar process are executed for each of the other recognition-object words. Thus, the parameter sequence generating section 5B also outputs mean similarity vector sequences corresponding to the other recognition-object words respectively. These output mean similarity vector sequences are also registered with the dictionary in the dictionary store section 6B as reference similarity vector sequences corresponding to the other recognition-object words respectively.

Experiments similar to the experiments in the embodiment of FIGS. 7–8 were done. According to the experiments under conditions where reference similarity vector sequences (dictionary similarity vector sequences) were determined on the basis of speech data generated from one male speaker and one female speaker, in this embodiment, good recognition results were obtained at a rate of 93.4%.

It should be noted that reference similarity vector sequences may be generated on the basis of speech data generated from three or more different speakers. In this case, an averaging calculation similar to the previously-mentioned averaging calculation is done repeatedly.

It should be noted that multi-sets of reference similarity vector sequences may be used. In this case, a set of reference similarity vector sequences is generated on the basis of speech data generated from each of two or more different speakers. In this case, good recognition results were obtained at a rate of 93.2% according to experiments.

DESCRIPTION OF THE SIXTH PREFERRED EMBODIMENT

Figure 10:
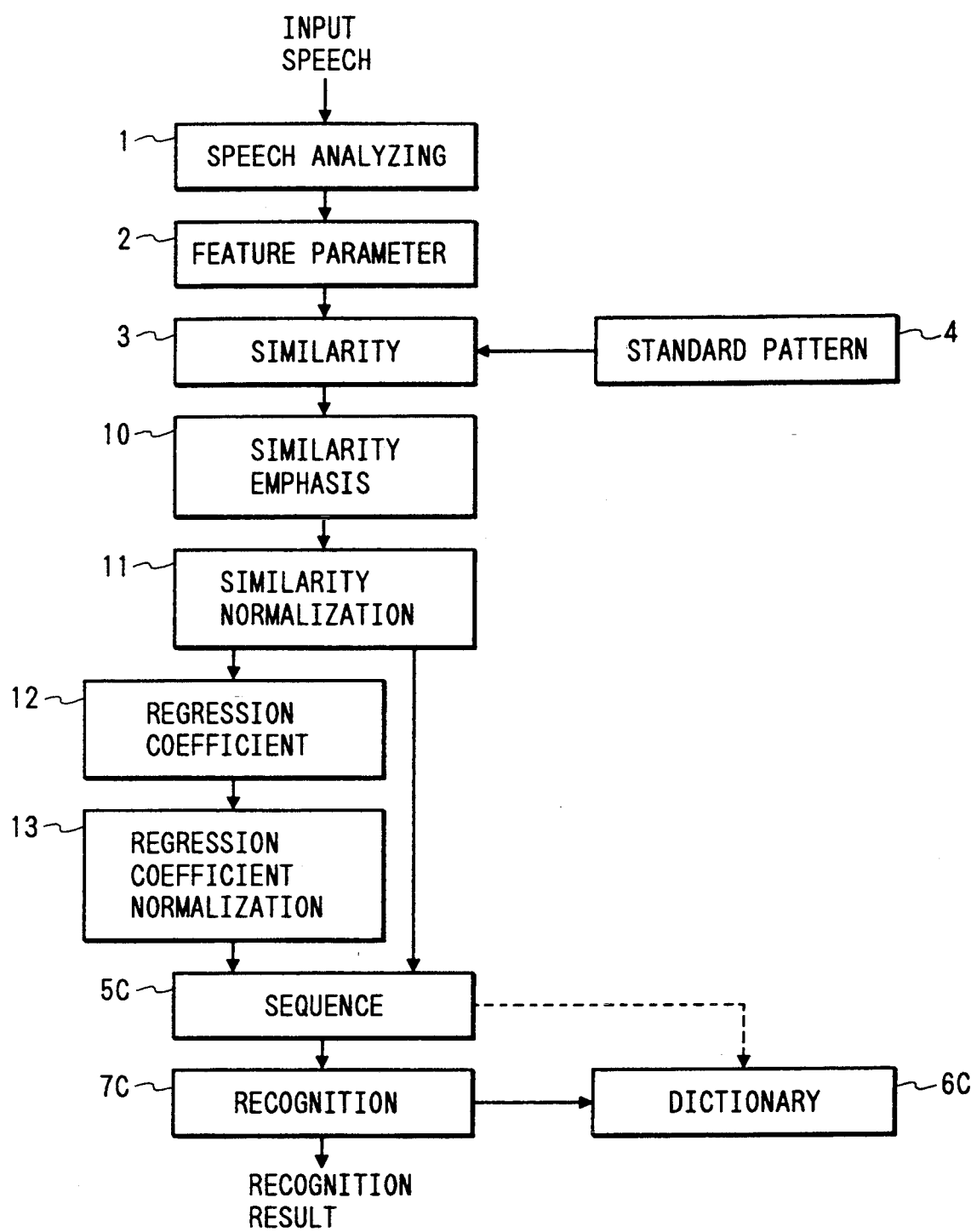
FIG. 10 is a diagram showing the flow of functions in a speech recognition method according to a sixth embodiment of this invention.

FIG. 10 relates to a sixth embodiment of this invention which is similar to the embodiment of FIGS. 1-3 except for design changes indicated hereinafter.

As shown in FIG. 10, a speech recognition system includes a speech analyzing section 1, a feature parameter extracting section 2, a similarity calculating section 3, a standard pattern store section 4, a parameter sequence generating section 5C, a dictionary store section 6C, a recognition section 7C, a similarity emphasizing section 10, a similarity normalizing section 11, a regression coefficient calculating section 12, and a regression coefficient normalizing section 13. The speech analyzing section 1, the feature parameter extracting section 2, the similarity calculating section 3, and the standard pattern store section 4 are similar to those of FIG. 2.

The similarity emphasizing section 10 sequentially receives 20 similarities, which correspond to 20 recognition-object words respectively, from the similarity calculating section 3 every frame, and rearranges the similarities into a vector form. The similarities in each similarity vector are subjected to an exponential emphasizing process so that the similarity vector are converted into a second similarity vector. During the emphasizing process, the components $G(a_i)$ of a second similarity vector (i=1, 2, . . . , 20) are expressed as follows.

$$G(a_i) = exp(\alpha a_i + \beta) \quad (12)$$

where $a_i$ denotes an i-th component of the original similarity vector, and "$\alpha$" and "$\beta$" denote predetermined constant values common to all of the phonemes and all of frames. In this way, greater similarities in each original similarity vector are emphasized relative to smaller similarities according to the exponential emphasizing function (12).

The similarity normalizing section 11 sequentially receives second similarity vectors from the similarity emphasizing section 10. Each second similarity vector a' is now expressed as $a' = (a_1', a_2', \ldots, a_i', \ldots, a_{20}')$. The similarity normalizing section 11 normalizes each second similarity vector a' into a third similarity vector a" by referring to the following equations.

$$a'' = \left( \frac{a_1'}{Q}, \frac{a_2'}{Q}, \ldots, \frac{a_{20}'}{Q} \right) \quad (13)$$

$$Q = \sqrt{\sum_{i=1}^{20} a_1'^2}$$

The absolute value of each third similarity vector a" is equal to 1.

In general, since phoneme standard patterns in the standard pattern store section 4 are generated from temporal patterns of feature parameters in and around a featuring frame, original similarities tend to be small in a part of the input speech which corresponds to a transition between phonemes. The emphasizing process and the normalizing process by the devices 10 and 11 prevent an underestimation of a feature in the relation between similarities which would be caused by small original similarities in an input speech part corresponding to a transition between phonemes.

The regression coefficient calculating section 12 sequentially receives third similarities from the similarity calculating section 3. The regression coefficient calculating section 12 calculates regression coefficients in a way similar to the way of the calculation of the regression coefficients by the regression coefficient calculating section 8 in the embodiment of FIGS. 5 and 6. The calculated regression coefficients correspond to temporal variations of the similarities. The total number of the regression coefficients is equal to "n" per similarity sequence. Specifically, a regression coefficient of a present frame agrees with the slope of a least-square approximation straight line with respect to the similarities of two frames preceding the present frame, the similarity of the present frame, and the similarities of two frames following the present frame.

The regression coefficient normalizing section 13 sequentially receives 20 regression coefficients, which correspond to the 20 recognition-object words respectively, from the regression coefficient calculating section 12 every frame, and rearranges the regression coefficients into a vector form. In addition, the similarity normalizing section 11 normalizes each regression coefficient vector into a second regression coefficient vector having an absolute value of 1.

The parameter sequence generating section 5C sequentially receives the second regression coefficients from the regression coefficient normalizing section 13, and arranges the received regression coefficients into a temporal sequence of vectors of the regression coefficients. In addition, the parameter sequence generating section 5C sequentially receives the third similarities from the similarity normalizing section 11, and arranges the received similarities into a temporal sequence of vectors of the similarities. The regression coefficient vector sequence (also referred to as the input-speech regression coefficient vector sequence) and the similarity vector sequence (also referred to as the input-speech similarity vector sequence) are fed to the recognition section 7C.

The dictionary store section 6C stores a dictionary which contains reference similarity vector sequences corresponding to recognition-object words respectively, and also which contains reference regression coefficient vector sequences corresponding to the recognition-object words respectively. The reference similarity vector sequences (also referred to as the dictionary similarity vector sequences) and the reference regression coefficient vector sequences (also referred to as the dictionary regression coefficient vector sequences) are fed from the dictionary store section 6C to the recognition section 7C. As will be explained later, the reference similarity vector sequences and the reference regression coefficient vector sequences are predetermined on the basis of speech data generated from a single speaker during a preliminary process which is executed before an actual speech recognition process.

The recognition section 7C executes the matching between a set of the input-speech similarity vector sequence and the input-speech regression coefficient vector sequence and sets of the reference similarity vector sequences and the reference regression coefficient vector sequences, and calculates the matching scores for the sets of the reference similarity vector sequences and the reference regression coefficient vector sequences which correspond to the recognition-object words respectively. The recognition section 7C selects the highest of the calculated matching scores, and decides a recognition result to be the recognition-object word corresponding to the highest matching score. Specifically, the matching calculation uses a DP matching technique as in the embodiment of FIGS. 1-3. In the case where a correlation cosine distance is used as a measure during the matching calculation, the distance function l(i, j) is expressed as follows.

$$l(i,j) = w \frac{a \cdot b}{|a| \cdot |b|} + (1-w) \frac{c \cdot d}{|c| \cdot |d|} \quad (14)$$

where "a" denotes an input-speech similarity vector in an i-th frame which is expressed as a=(a1, a2, ..., a20); "b" denotes a dictionary similarity vector in a j-th frame which is expressed as b=(b1, b2, ..., b20); "c" denotes an input-speech regression coefficient vector in an i-th frame which is expressed as c=(c1, c2, ..., c20); "d" denotes a dictionary regression coefficient vector in a j-th frame which is expressed as d=(d1, d2, ..., d20); and "w" denotes a weight which agrees with a predetermined ratio of mixing the similarity part and the regression coefficient part. It is preferable that the mixing ratio is in the range of 0.4 to 0.6. Since an input-speech similarity vector "a", a dictionary similarity vector "b", an input-speech regression coefficient vector "c", and a dictionary regression coefficient vector "d" are normalized, the absolute values $|a|$, $|b|$, $|c|$, and $|d|$ are equal to 1. Thus, the equation (14) is simplified into the following equation.

$$l(i,j) = wa \cdot b + (1-w)c \cdot d \quad (15)$$

The reference similarity vector sequences (the dictionary similarity vector sequences) and the reference regression coefficient vector sequences (the dictionary regression coefficient vector sequences) are predetermined on the basis of speech data generated from a single speaker during a preliminary process which is executed before an actual speech recognition process. During the preliminary process, a speaker generates pieces of speech which represent preset words (recognition-object words) respectively. The pieces of the generated speech are sequentially inputted into the speech recognition system, and the pieces of the input speech are sequentially processed in the speech recognition system. Specifically, each piece of the input speech is processed by the sections 1-4, 5C, and 10-13 of FIG. 10 in a manner similar to the manner of the processing of input speech during the actual speech recognition process. As a result, the parameter sequence generating section 5C outputs a set of the similarity vector sequence and the regression coefficient vector sequence related to the processed piece of the input speech which corresponds to one of the recognition-object words. The output similarity vector sequence and the output regression coefficient vector sequence are registered with the dictionary in the dictionary store section 6C as a reference similarity vector sequence and a reference regression coefficient vector sequence corresponding to the present recognition-object word. The parameter sequence generating section 5C also outputs sets of the similarity vector sequences and the regression coefficient vector sequences related to the other pieces of the input speech which corresponding to the remaining recognition-object words respectively. The output similarity vector sequences and the output regression coefficient vector sequences are also registered with the dictionary in the dictionary store section 6C as reference similarity vector sequences and reference regression coefficient vector sequences corresponding to the remaining recognition-object words respectively.

Experiments were performed by using speech data which was generated from 20 speakers and which represented 212 different words for each speaker. The preliminary process was done. During the preliminary process, the speech data which was generated by one of the 20 speakers and which represented the 212 different words was inputted into the speech recognition system and was processed in the speech recognition system, so that reference similarity vector sequences and reference regression coefficient vector sequences corresponding to the 212 different words respectively were generated on the basis of the speech data. After the preliminary process, the actual speech recognition process was executed. During the actual speech recognition process, the speech data which was generated by the other 19 speakers and which represented the 212 different words for each speaker was inputted into the speech recognition system and was subjected to speech recognition. Good recognition results were obtained at a rate of 91.6%.

Reference similarity vector sequences (dictionary similarity vector sequences) and reference regression coefficient vector sequences (dictionary regression coefficient vector sequences) may be determined through an averaging calculation on the basis of speech data generated from one male speaker and one female speaker as in the second embodiment. In this case, good recognition results were obtained at a rate of 95.9% according to experiments.

DESCRIPTION OF THE SEVENTH PREFERRED EMBODIMENT

Figure 11:
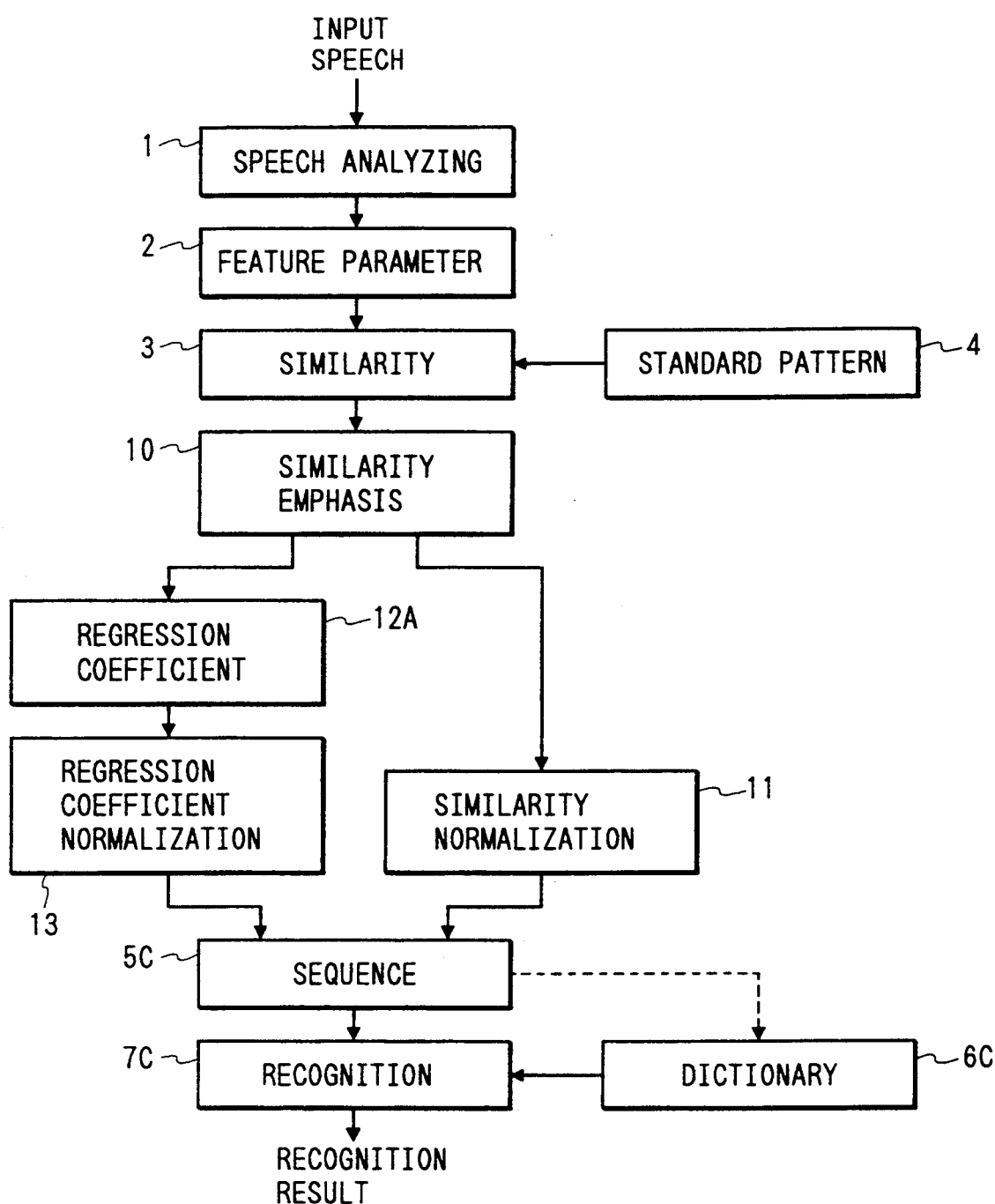
FIG. 11 is a diagram showing the flow of functions in a speech recognition method according to a seventh embodiment of this invention.

FIG. 11 relates to a seventh embodiment of this invention which is similar to the embodiment of FIG. 10 except that a regression coefficient calculating section 12A is used in place of the regression coefficient calculating section 12 (see FIG. 10).

In the embodiment of FIG. 11, the regression coefficient calculating section 12A directly receives similarities from a similarity emphasizing section 10, and calculates regression coefficients from the received similarities.

DESCRIPTION OF THE EIGHTH PREFERRED EMBODIMENT

Figure 12:
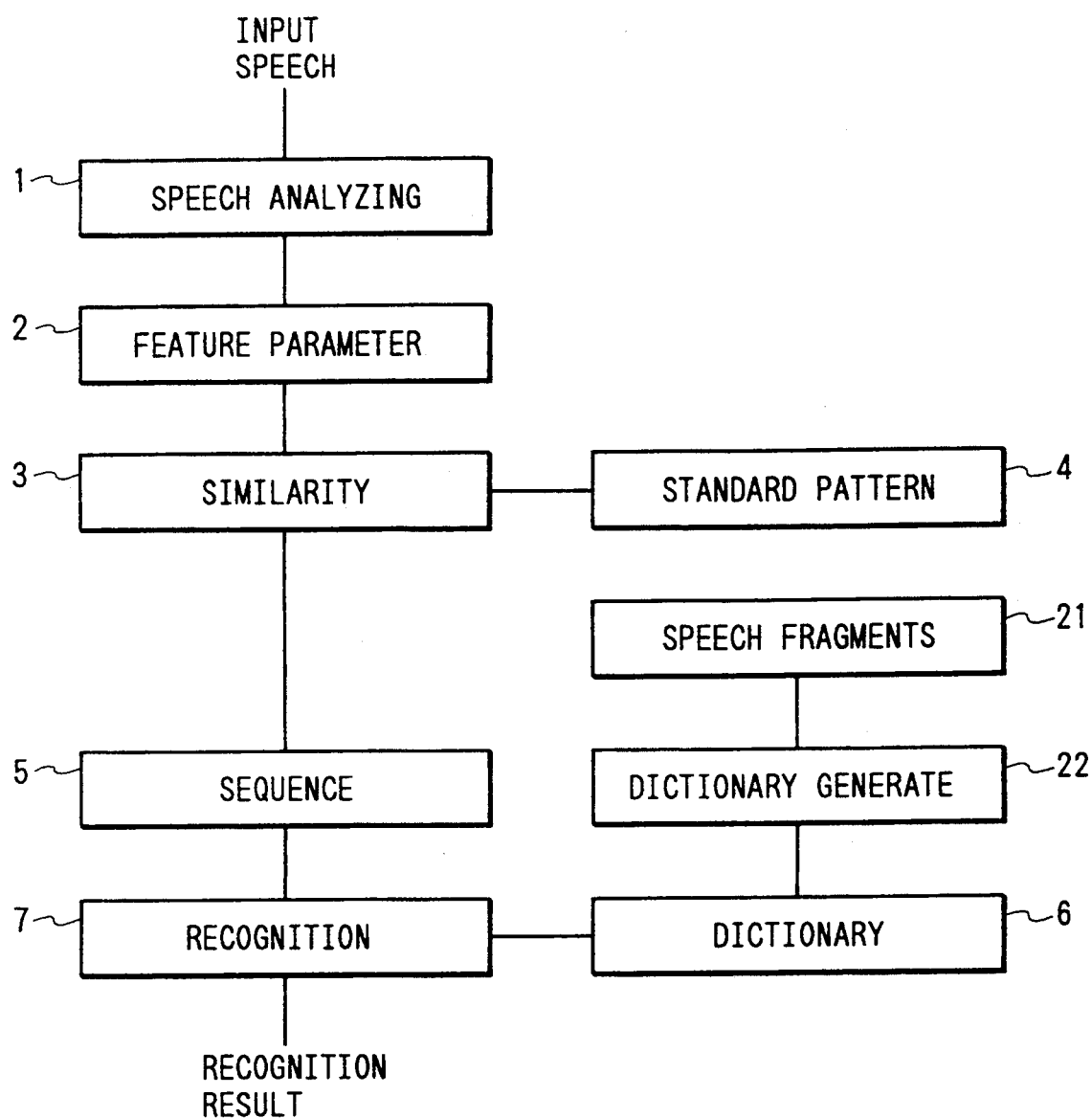
FIG. 12 is a diagram showing the flow of functions in a speech recognition method according to an eighth embodiment of this invention.

FIG. 12 relates to an eighth embodiment of this invention which is similar to the embodiment of FIGS. 1-3 except for the generation of reference similarity vector sequences (dictionary similarity vector sequences).

As shown in FIG. 12, a speech recognition system includes a speech analyzing section 1, a feature parameter extracting section 2, a similarity calculating section 3, a standard pattern store section 4, a parameter sequence generating section 5, a dictionary store section 6, a recognition section 7, a speech fragment store section 21, and a dictionary similarity vector sequence generating section 22.

Figure 13:
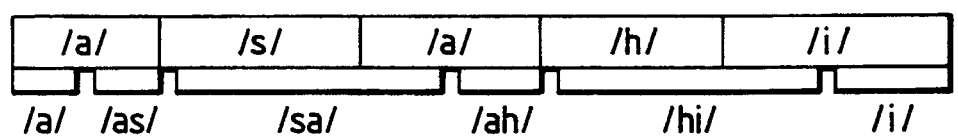
FIG. 13 is a time-domain diagram showing the contents of speech of a Japanese word "asahi", and consonant-vowel and vowel-consonant fragments of the speech in the eighth embodiment.
Figure 14:
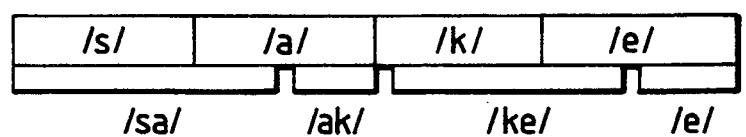
FIG. 14 is a time-domain diagram showing the contents of speech of a Japanese word "sake", and consonant-vowel and vowel-consonant fragments of the speech in the eighth embodiment.

The dictionary store section 6 stores a dictionary which contains the reference similarity vector sequences, that is, the dictionary similarity vector sequences. The dictionary similarity vector sequences are predetermined on the basis of speech data generated from a single speaker during a preliminary process which is executed before an actual speech recognition process. During the preliminary process, a speaker generates pieces of speech which represent a set of words chosen in consideration of phonetic environments. The pieces of the generated speech are sequentially inputted into the speech recognition system, and the pieces of the input speech are sequentially processed in the speech recognition system. Specifically, each piece of the input speech is processed by the sections 1-5 of FIG. 12 in a manner similar to the manner of the processing of input speech during an actual speech recognition process. As a result, the parameter sequence generating section 5 outputs a similarity vector sequence related to the processed piece of the input speech which corresponds to one of the words. The output similarity vector sequence has a format similar to the format of FIG. 3. The parameter sequence generating section 5 also outputs similarity vector sequences related to the other pieces of the input speech which correspond to the remaining words respectively. Portions each corresponding to a speech fragment of a sequence of a consonant and a vowel are separated from all the output similarity vector sequences, and the separated portions form CV patterns respectively. In addition, portions each corresponding to a speech fragment of a sequence of a vowel and a consonant are separated from all the output similarity vector sequences, and the separated portions form VC patterns respectively. In the previously-mentioned word set, the positions of phonemes are labelled by referring to spectrum information. With respect to each CV pattern, the portion between a frame corresponding to the start of a consonant and a frame corresponding to the center of a subsequent vowel is separated according to the phoneme labels. With respect to each VC pattern, tile portion between a frame corresponding to the center of a vowel to a frame corresponding to the end of the vowel (the start of a subsequent consonant) is separated according to the phoneme labels. In this way, the center of a vowel forms a boundary between separated portions. According to this design, since information of a transition from a consonant to a vowel is effectively used, the rate of good recognition results can be higher. The CV patterns and the VC patterns are stored into the speech fragment store section 21. The separation of CV and VC patterns will be further described. In the case of a Japanese word "asahi", as shown in FIG. 13, the separated CV and VC patterns correspond to /a/, /as/, /sa/, /ah/, /hi/, and /i/. In the case of a Japanese word "sake", as shown in FIG. 14, the separated CV and VC patterns correspond to /sa/, /ak/, /ke/, and /e/.

The dictionary similarity vector sequence generating section 22 is informed of recognition-object words. The dictionary similarity vector sequence generating section 22 fetches necessary. CV and VC patterns from the speech fragment store section 21 in response to the information of the recognition-object words, and combines the CV and VC patterns into dictionary similarity vector sequences which correspond to the recognition-object words respectively. For example, in tile generation of a dictionary similarity vector sequence corresponding to a Japanese word "akai", the CV and VC patterns corresponding to /a/, /ak/, /ka/, /ai/, and /i/ are fetched from the speech fragment store section 21, and the fetched CV and VC patterns are combined into the dictionary similarity vector sequence. The dictionary similarity vector sequence generating section 22 stores the dictionary similarity vector sequences into the dictionary store section 6.

Reference similarity vector sequences (dictionary similarity vector sequences) may be determined through an averaging calculation on the basis of speech data generated from two or more speakers as in the second embodiment. In this case, average CV and VC patterns are generated on the basis of the speech data from two or more speakers, and the average CV and VC patterns are stored into the speech fragment store section 21.

A matching process by the recognition section 7 may use a hidden Markov model (HMM) method in place of a DP method. In this case, learning is done with respect to separated CV and VC patterns, and HMMs having a unit of CV and VC are formed. The HMMs are connected to generate matching references. The matching process by the recognition section 7 may use other distance measures such as a Bayesian decision distance measure, a neural-network distance measure, or an LVQ (learning vector quantization) distance measure.

Speech fragments may further include other types such as a type related to a sequence of a vowel, a consonant, and a vowel.

The dictionary store section 6 may store sequences of connection of the speech fragments in place of the reference similarity vector sequences. In this case, reference similarity vector sequences are generated according to the connection sequences during the calculation of the similarities with respect to the input speech.

DESCRIPTION OF THE NINTH PREFERRED EMBODIMENT

Figure 15:
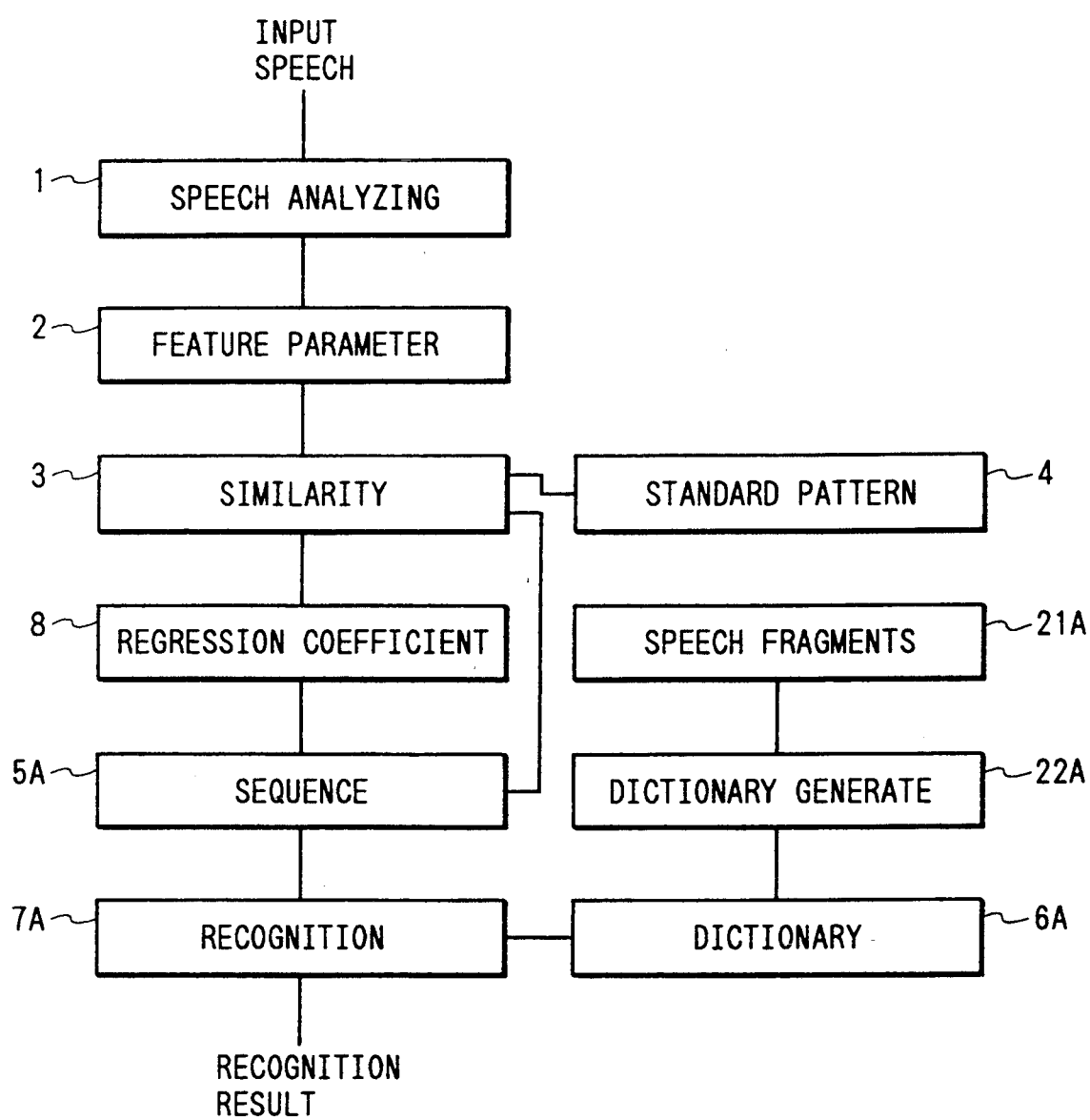
FIG. 15 is a diagram showing the flow of functions in a speech recognition method according to a ninth embodiment of this invention.

FIG. 15 relates to a ninth embodiment of this invention which is similar to the embodiment of FIGS. 5 and 6 except for the generation of reference similarity vector sequences (dictionary similarity vector sequences) and reference regression coefficient vector sequences (dictionary regression coefficient vector sequences).

As shown in FIG. 15, a speech recognition system includes a speech analyzing section 1, a feature parameter extracting section 2, a similarity calculating section 3, a standard pattern store section 4, a parameter sequence generating section 5A, a dictionary store section 6A, a recognition section 7A, a regression coefficient calculating section 8, a speech fragment store section 21A, and a dictionary vector sequence generating section 22A.

The dictionary store section 6A stores a dictionary which contains the reference similarity vector sequences (the dictionary similarity vector sequences) and the reference regression coefficient vector sequences (the dictionary regression coefficient vector sequences). The dictionary similarity vector sequences and the dictionary regression coefficient vector sequences are predetermined on the basis of speech data generated from a single speaker during a preliminary process which is executed before an actual speech recognition process. During the preliminary process, a speaker generates pieces of speech which represent a set of words chosen in consideration of phonetic environments. The pieces of the generated speech are sequentially inputted into the speech recognition system, and the pieces of the input speech are sequentially processed in the speech recognition system. Specifically, each piece of the input speech is processed by the sections 1-4, 5A, and 8 of FIG. 15 in a manner similar to the manner of the processing of input speech during an actual speech recognition process. As a result, the parameter sequence generating section 5A outputs a similarity vector sequence related to the processed piece of the input speech which corresponds to one of the words. The parameter sequence generating section 5A also outputs similarity vector sequences related to the other pieces of the input speech which correspond to the remaining words respectively. In addition, the parameter sequence generating section 5A outputs a regression coefficient vector sequence related to the processed piece of the input speech which corresponds to one of the words. The parameter sequence generating section 5A also outputs regression coefficient vector sequences related to the other pieces of the input speech which correspond to the remaining words respectively.

Portions each corresponding to a speech fragment of a sequence of a consonant and a vowel are separated from all the output similarity vector sequences, and the separated portions form similarity CV patterns respectively. In addition, portions each corresponding to a speech fragment of a sequence of a vowel and a consonant are separated from all the output similarity vector sequences, and the separated portions form similarity VC patterns respectively. In the previously-mentioned word set, the positions of phonemes are labelled by referring to spectrum information. With respect to each similarity CV pattern, the portion between a frame corresponding to the start of a consonant and a frame corresponding to the center of a subsequent vowel is separated according to the phoneme labels. With respect to each similarity VC pattern, the portion between a frame corresponding to the center of a vowel to a frame corresponding to the end of the vowel (the start of a subsequent consonant) is separated according to the phoneme labels. In this way, the center of a vowel forms a boundary between separated portions. According to this design, since information of a transition from a consonant to a vowel is effectively used, the rate of good recognition results can be higher. The similarity CV patterns and the similarity VC patterns are stored into the speech fragment store section 21A.

Portions each corresponding to a speech fragment of a sequence of a consonant and a vowel are separated from all the output regression coefficient vector sequences, and the separated portions form regression coefficient CV patterns respectively. In addition, portions each corresponding to a speech fragment of a sequence of a vowel and a consonant are separated from all the output regression coefficient vector sequences, and the separated portions form regression coefficient VC patterns respectively. In the previously-mentioned word set, the positions of phonemes are labelled by referring to spectrum information. With respect to each regression coefficient CV pattern, the portion between a frame corresponding to the start of a consonant and a frame corresponding to the center of a subsequent vowel is separated according to the phoneme labels. With respect to each regression coefficient VC pattern, the portion between a frame corresponding to the center of a vowel to a frame corresponding to the end of the vowel (the start of a subsequent consonant) is separated according to the phoneme labels. In this way, the center of a vowel forms a boundary between separated portions. According to this design, since information of a transition from a consonant to a vowel is effectively used, the rate of good recognition results can be higher. The regression coefficient CV patterns and the regression coefficient VC patterns are stored into the speech fragment store section 21A.

The dictionary vector sequence generating section 22A is informed of recognition-object words. The dictionary vector sequence generating section 22A fetches necessary similarity CV and VC patterns from the speech fragment store section 21A in response to the information of the recognition-object words, and combines the similarity CV and VC patterns into dictionary similarity vector sequences which correspond to the recognition-object words respectively. The dictionary vector sequence generating section 22A stores the dictionary similarity vector sequences into the dictionary store section 6. In addition, the dictionary vector sequence generating section 22A fetches necessary regression coefficient CV and VC patterns from the speech fragment store section 21A in response to the information of the recognition-object words, and combines the regression coefficient CV and VC patterns into dictionary regression coefficient vector sequences which correspond to the recognition-object words respectively. The dictionary vector sequence generating section 22A stores the dictionary regression coefficient vector sequences into the dictionary store section 6.

Reference similarity vector sequences (dictionary similarity vector sequences) and reference regression coefficient vector sequences (dictionary regression coefficient vector sequences) may be determined through an averaging calculation on the basis of speech data generated from two or more speakers as in the second embodiment. In this case, average similarity CV and VC patterns and average regression coefficient CV and VC patterns are generated on the basis of the speech data from two or more speakers, and the average similarity CV and VC patterns and the average regression coefficient CV and VC patterns are stored into the speech fragment store section 21A.

A matching process by the recognition section 7A may use a hidden Markov model (HMM) method in place of a DP method. In this case, learning is done with respect to separated CV and VC patterns, and HMMs having a unit of CV and VC are formed. The HMMs are connected to generate matching references. The matching process by the recognition section 7A may use other distance measures such as a Bayesian decision distance measure, a neural-network distance measure, or an LVQ (learning vector quantization) distance measure.

Speech fragments may further include other types such as a type related to a sequence of a vowel, a consonant, and a vowel.

DESCRIPTION OF THE TENTH PREFERRED EMBODIMENT

Figure 16:
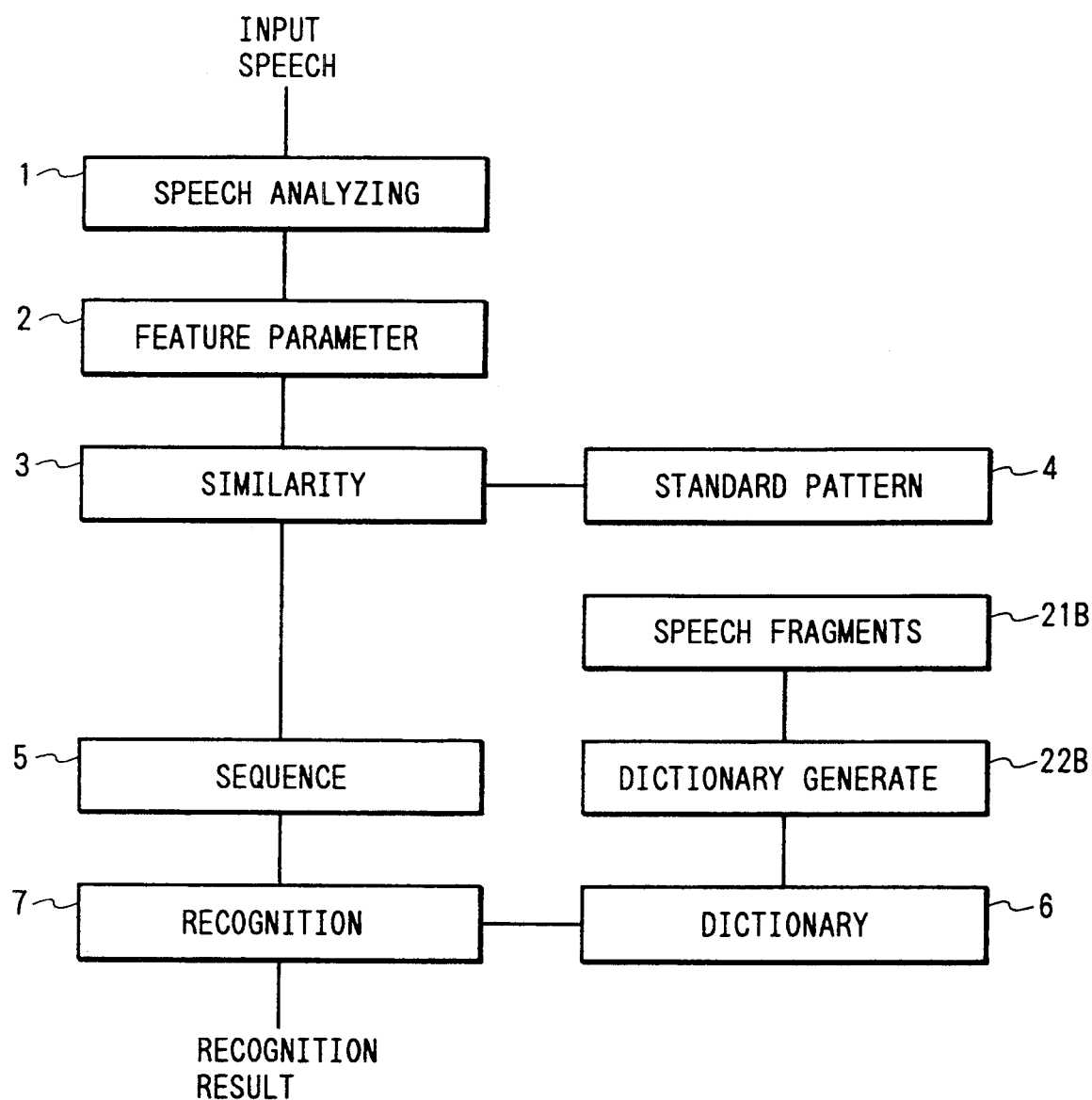
FIG. 16 is a diagram showing the flow of functions in a speech recognition method according to a tenth embodiment of this invention.

FIG. 16 relates to a tenth embodiment of this invention which is similar to the embodiment of FIGS. 1–3 except for the generation of reference similarity vector sequences (dictionary similarity vector sequences).

As shown in FIG. 16, a speech recognition system includes a speech analyzing section 1, a feature parameter extracting section 2, a similarity calculating section 3, a standard pattern store section 4, a parameter sequence generating section 5, a dictionary store section 6, a recognition section 7, a speech fragment store section 21B, and a dictionary similarity vector sequence generating section 22B.

The dictionary store section 6 stores a dictionary which contains the reference similarity vector sequences, that is, the dictionary similarity vector sequences. The dictionary similarity vector sequences are predetermined on the basis of speech data generated from a single speaker during a preliminary process which is executed before an actual speech recognition process.

During the preliminary process, a speaker generates pieces of speech which represent a set of words chosen in consideration of phonetic environments. The pieces of the generated speech are sequentially inputted into the speech recognition system, and the pieces of the input speech are sequentially processed in the speech recognition system. Specifically, each piece of the input speech is processed by the sections 1–5 of FIG. 16 in a manner similar to the manner of the processing of input speech during an actual speech recognition process. As a result, the parameter sequence generating section 5 outputs a similarity vector sequence related to the processed piece of the input speech which corresponds to one of the words. The output similarity vector sequence has a format similar to the format of FIG. 3. The parameter sequence generating section 5 also outputs similarity vector sequences related to the other pieces of the input speech which correspond to the remaining words respectively. Portions each corresponding to a speech fragment of a sequence of a consonant and a vowel are separated from all the output similarity vector sequences, and the separated portions form CV patterns respectively. In addition, portions each corresponding to a speech fragment of a sequence of a vowel and a consonant are separated from all the output similarity vector sequences, and the separated portions form VC patterns respectively. In the previously-mentioned word set, tile positions of phonemes are labelled by referring to spectrum information. With respect to each CV pattern, the portion between a frame corresponding to the center of a consonant and a frame corresponding to the center of a subsequent vowel is separated according to the phoneme labels. With respect to each VC pattern, the portion between a frame corresponding to the center of a vowel to a frame corresponding to the center of a subsequent consonant is separated according to the phoneme labels. In this way, the centers of vowels and consonants form boundaries between separated portions. According to this design, since information of a transition from a consonant to a vowel and information of a transition from a vowel to a consonant are effectively used, the rate of good recognition results can be higher. The CV patterns and the VC patterns are stored into the speech fragment store section 21. The separation of CV and VC patterns will be further described. In the case of a Japanese word "asahi", as shown in FIG. 17, the separated CV and VC patterns correspond to /a/, /as/, /sa/, /ah/, /hi/, and /i/. In the case of a Japanese word "sake", as shown in FIG. 18, the separated CV and VC patterns correspond to /sa/, /ak/, /ke/, and /e/. In the case of a Japanese word "paaku", as shown in FIG. 19, the separated CV and VC patterns correspond to /pa/, /aa/, /ak/, /ku/, and /u/. As shown in FIG. 19, VV patterns like /aa/ are also separated in some cases.

In respect of a speech fragment different from other speech fragments of the previously-mentioned word set, the corresponding CV or VC pattern is directly stored into the speech fragment store section 21B. In the case where two similar speech fragments are present with respect to the previously-mentioned word set, DP matching is done between the two similar speech fragments to temporally match them. For example, similar speech fragments /ak/ are separated from the Japanese word "sake" and the Japanese word "paaku". The similar speech fragments are different in duration period. Accordingly, DP matching is done between the two similar speech fragments to temporally match them in a manner such as shown in FIG. 20. Calculation is given of the mean value of the similarities in each pair of temporally matched frames of the two similar speech fragments. A vector of the calculated mean similarities is stored into the speech fragment store section 21B. For example, in the case where the i-th frame of the first speech fragment /ak/ corresponds to the j-th frame of the second speech fragment /ak/ as shown in FIG. 20, when the similarity vector of the i-th frame of the first speech fragment /ak/ is represented as "m=(m1, m2, ..., m20) and the similarity vector of the corresponding j-th frame of the second speech fragment /ak/ is represented as "n=(n1, n2, ..., n20)", the averaging calculation generates the mean similarity vector which is given as "f=((m1+n1)/2, (m2+n2)/2, ..., (m20+n20)/2)". In the case where three or more similar speech fragments are present with respect to the previously-mentioned word set, such averaging calculation is repeated to provide a mean similarity vector which is stored into the speech fragment store section 21B.

The dictionary similarity vector sequence generating section 22B is informed of recognition-object words. The dictionary similarity vector sequence generating section 22B fetches necessary CV and VC patterns from the speech fragment store section 21B in response to the information of the recognition-object words, and combines the CV and VC patterns into dictionary similarity vector sequences which correspond to the recognition-object words respectively. For example, in the generation of a dictionary similarity vector sequence corresponding to a Japanese word "akai", the CV and VC patterns corresponding to /a/, /ak/, /ka/, /ai/, and /i/ are fetched from the speech fragment store section 21B, and the fetched CV and VC patterns are combined into the dictionary similarity vector sequence. The dictionary similarity vector sequence generating section 22B stores the dictionary similarity vector sequences into the dictionary store section 6.

Reference similarity vector sequences (dictionary similarity vector sequences) may be determined through an averaging calculation on the basis of speech data generated from two or more speakers as in the second embodiment. In this case, average CV and VC patterns are generated on the basis of the speech data from two or more speakers, and the average CV and VC patterns are stored into the speech fragment store section 21B.

A matching process by the recognition section 7 may use a hidden Markov model (HMM) method in place of a DP method. In this case, learning is done with respect to separated CV and VC patterns, and HMMs having a unit of CV and VC are formed. The HMMs are connected to generate matching references. The matching process by the recognition section 7 may use other distance measures such as a Bayesian decision distance measure, a neural-network distance measure, or an LVQ (learning vector quantization) distance measure.

Speech fragments may further include other types such as a type related to a sequence of a vowel, a consonant, and a vowel.

DESCRIPTION OF THE ELEVENTH PREFERRED EMBODIMENT

Figure 21:
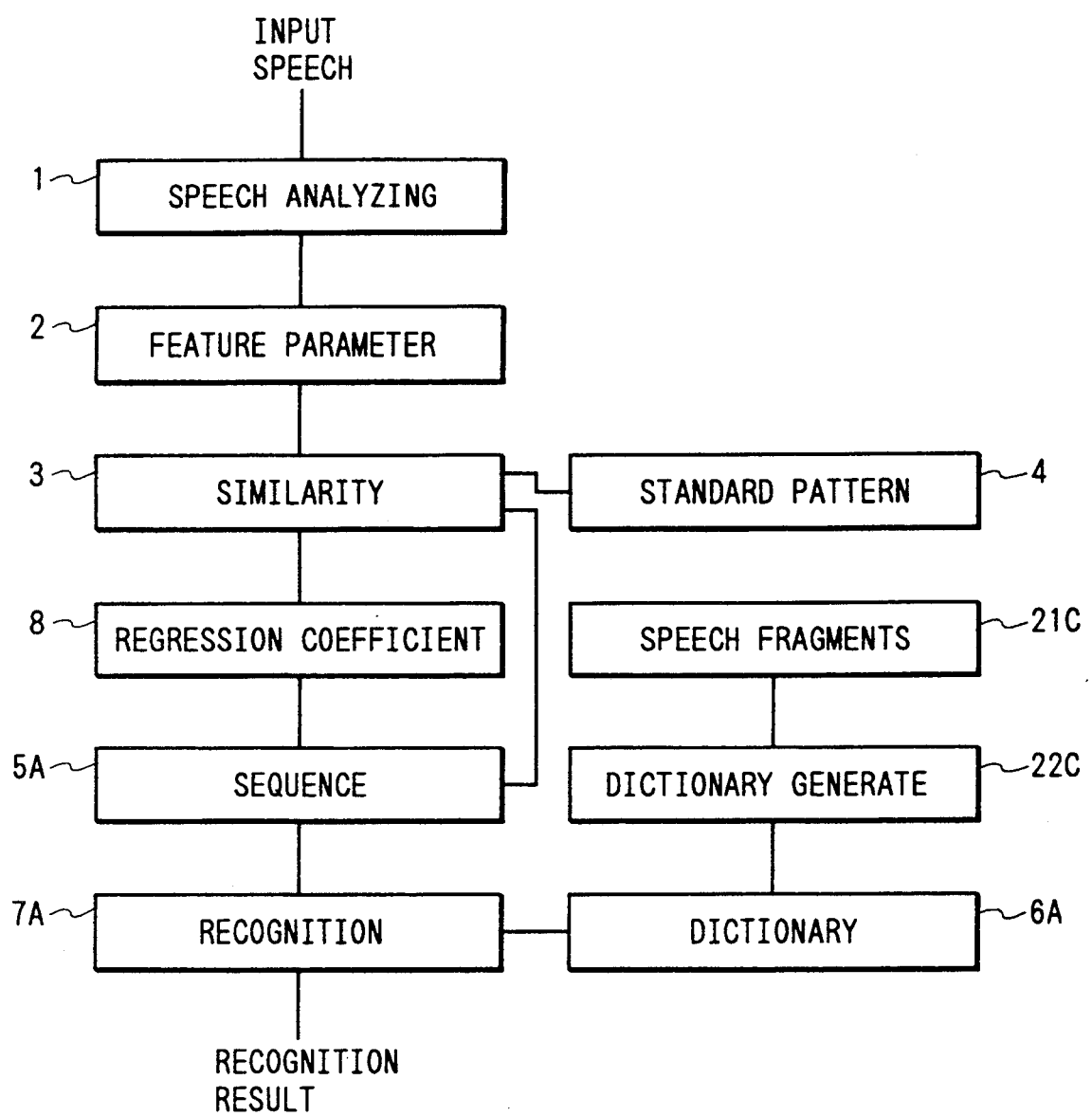
FIG. 21 is a diagram showing the flow of functions in a speech recognition method according to an eleventh embodiment of this invention.

FIG. 21 relates to an eleventh embodiment of this invention which is similar to the embodiment of FIGS. 5 and 6 except for the generation of reference similarity vector sequences (dictionary similarity vector sequences) and reference regression coefficient vector sequences (dictionary regression coefficient vector sequences).

As shown in FIG. 21, a speech recognition system includes a speech analyzing section 1, a feature parameter extracting section 2, a similarity calculating section 3, a standard pattern store section 4, a parameter sequence generating section 5A, a dictionary store section 6A, a recognition section 7A, a regression coefficient calculating section 8, a speech fragment store section 21C, and a dictionary vector sequence generating section 22C.

The dictionary store section 6A stores a dictionary which contains the reference similarity vector sequences (the dictionary similarity vector sequences) and the reference regression coefficient vector sequences (the dictionary regression coefficient vector sequences). The dictionary similarity vector sequences and the dictionary regression coefficient vector sequences are predetermined on the basis of speech data generated from a single speaker during a preliminary process which is executed before an actual speech recognition process. During the preliminary process, a speaker generates pieces of speech which represent a set of words chosen in consideration of phonetic environments. The pieces of the generated speech are sequentially inputted into the speech recognition system, and the pieces of the input speech are sequentially processed in the speech recognition system. Specifically, each piece of the input speech is processed by the sections 1–4, 5A, and 8 of FIG. 21 in a manner similar to the manner of the processing of input speech during an actual speech recognition process. As a result, the parameter sequence generating section 5A outputs a similarity vector sequence related to the processed piece of the input speech which corresponds to one of the words. The parameter sequence generating section 5A also outputs similarity vector sequences related to the other pieces of the input speech which correspond to the remaining words respectively. In addition, the parameter sequence generating section 5A outputs a regression coefficient vector sequence related to the processed piece of the input speech which corresponds to one of the words. The parameter sequence generating section 5A also outputs regression coefficient vector sequences related to the other pieces of the input speech which correspond to the remaining words respectively.

Portions each corresponding to a speech fragment of a sequence of a consonant and a vowel are separated from all the output similarity vector sequences, and the separated portions form similarity CV patterns respectively. In addition, portions each corresponding to a speech fragment of a sequence of a vowel and a consonant are separated from all the output similarity vector sequences, and the separated portions form similarity VC patterns respectively. In the previously-mentioned word set, the positions of phonemes are labelled by referring to spectrum information. With respect to each similarity CV pattern, the portion between a frame corresponding to the center of a consonant and a frame corresponding to the center of a subsequent vowel is separated according to the phoneme labels. With respect to each similarity VC pattern, the portion between a frame corresponding to the center of vowel to a frame corresponding to the center of a subsequent consonant is separated according to the phoneme labels. In this way, the centers of vowels and consonants form boundaries between separated portions. According to this design, since information of a transition from a consonant to a vowel and information of a transition from a vowel to a consonant are effectively used, the rate of good recognition results can be higher. The similarity CV patterns and the similarity VC patterns are stored into the speech fragment store section 21C.

In respect of a speech fragment different from other speech fragments of the previously-mentioned word set, the corresponding similarity CV or VC pattern is directly stored into the speech fragment store section 21C. In the case where two similar speech fragments are present with respect to the previously-mentioned word set, DP matching is done between the two similar speech fragments to temporally match them. For example, similar speech fragments /ak/ are separated from the Japanese word "sake" and the Japanese word "paaku". The similar speech fragments are different in duration period. Accordingly, DP matching is done between the two similar speech fragments to temporally match them in a manner such as shown in FIG. 20. Calculation is given of the mean value of the similarities in each pair of temporally matched frames of the two similar speech fragments. A vector of the calculated mean similarities is stored into the speech fragment store section 21C. For example, in the case where the i-th frame of the first speech fragment /ak/ corresponds to the j-th frame of the second speech fragment /ak/ as shown in FIG. 20, when the similarity vector of the i-th frame of the first speech fragment /ak/ is represented as "$m = (m1, m2, \ldots, m20)$" and the similarity vector of the corresponding j-th frame of the second speech fragment /ak/ is represented as "$n = (n1, n2, \ldots, n20)$", the averaging calculation generates the mean similarity vector which is given as "$f = ((m1+n1)/2, (m2+n2)/2, \ldots, (m20+n20)/2)$". In the case where three or more similar speech fragments are present with respect to the previously-mentioned word set, such averaging calculation is repeated to provide a mean similarity vector which is stored into the speech fragment store section 21C.

Portions each corresponding to a speech fragment of a sequence of a consonant and a vowel are separated from all the output regression coefficient vector sequences, and the separated portions form regression coefficient CV patterns respectively. In addition, portions each corresponding to a speech fragment of a sequence of a vowel and a consonant are separated from all the output regression coefficient vector sequences, and the separated portions form regression coefficient VC patterns respectively. In the previously-mentioned word set, the positions of phonemes are labelled by referring to spectrum information. With respect to each regression coefficient CV pattern, the portion between a frame corresponding to the center of a consonant and a frame corresponding to the center of a subsequent vowel is separated according to the phoneme labels. With respect to each regression coefficient VC pattern, the portion between a frame corresponding to the center of a vowel to a frame corresponding to the center of a subsequent consonant is separated according to the phoneme labels. In this way, the centers of vowels and consonants form boundaries between separated portions. According to this design, since information of a transition from a consonant to a vowel and information of a transition from a vowel to a consonant are effectively used, the rate of good recognition results can be higher. The regression coefficient CV patterns and the regression coefficient VC patterns are stored into the speech fragment store section 21C.

In respect of a speech fragment different from other speech fragments of the previously-mentioned word set, the corresponding regression coefficient CV or VC pattern is directly stored into the speech fragment store section 21C. In the case where two similar speech fragments are present with respect to the previously-mentioned word set, DP matching is done between the two similar speech fragments to temporally match them. For example, similar speech fragments /ak/ are separated from the Japanese word "sake" and the Japanese word "paaku". The similar speech fragments are different in duration period. Accordingly, DP matching is done between the two similar speech fragments to temporally match them in a manner such as shown in FIG. 20. Calculation is given of the mean value of the regression coefficients in each pair of temporally matched frames of the two similar speech fragments. A vector of the calculated mean regression coefficients is stored into the speech fragment store section 21C. For example, in the case where the i-th frame of the first speech fragment /ak/ corresponds to the j-th frame of the second speech fragment /ak/ as shown in FIG. 20, when the regression coefficient vector of the i-th frame of the first speech fragment /ak/ is represented as "m=(m1, m2, ..., m20) and the regression coefficient vector of the corresponding j-th frame of the second speech fragment /ak/ is represented as "n=(n1, n2, ..., n20)", the averaging calculation generates the mean regression coefficient vector which is given as "f=((m1+n1)/2, (m2+n2)/2, ..., (m20+n20)/2)". In the case where three or more similar speech fragments are present with respect to the previously-mentioned word set, such averaging calculation is repeated to provide a mean regression coefficient vector which is stored into the speech fragment store section 21C.

The dictionary vector sequence generating section 22C is informed of recognition-object words. The dictionary vector sequence generating section 22C fetches necessary similarity CV and VC patterns from tile speech fragment store section 21C in response to the information of the recognition-object words, and combines the similarity CV and VC patterns into dictionary similarity vector sequences which correspond to the recognition-object words respectively. The dictionary vector sequence generating section 22C stores the dictionary similarity vector sequences into the dictionary store section 6. In addition, the dictionary vector sequence generating section 22C fetches necessary regression coefficient CV and VC patterns from the speech fragment store section 21C in response to the information of the recognition-object words, and combines the regression coefficient CV and VC patterns into dictionary regression coefficient vector sequences which correspond to the recognition-object words respectively. The dictionary vector sequence generating section 22C stores the dictionary regression coefficient vector sequences into the dictionary store section 6.

Reference similarity vector sequences (dictionary similarity vector sequences) and reference regression coefficient vector sequences (dictionary regression coefficient vector sequences) may be determined through an averaging calculation on the basis of speech data generated from two or more speakers as in the second embodiment. In this case, average similarity CV and VC patterns and average regression coefficient CV and VC patterns are generated on the basis of the speech data from two or more speakers, and the average similarity CV and VC patterns and the average regression coefficient CV and VC patterns are stored into the speech fragment store section 21C.

A matching process by the recognition section 7A may use a hidden Markov model (HMM) method in place of a DP method. In this case, leaning is done with respect to separated CV and VC patterns, and HMMs having a unit of CV and VC are formed. The HMMs are connected to generate matching references. The matching process by the recognition section 7A may use other distance measures such as a Bayesian decision distance measure, a neural-network distance measure, or an LVQ (learning vector quantization) distance measure.

Speech fragments may further include other types such as a type related to a sequence of a vowel, a consonant, and a vowel.

Experiments were done as follows. During the preliminary process, two speakers generated 530 words which were chosen in consideration of phonetic environments. Similarity CV and VC patterns and regression coefficient CV and VC patterns were generated from the word data. The preliminary process was followed by the actual speech recognition process. The actual speech recognition process was executed on the speech data which was generated from 20 speakers and which represented 212 different words for each speaker. Good recognition results were obtained at a rate of 94.3%.

DESCRIPTION OF THE TWELFTH PREFERRED EMBODIMENT

Figure 22:
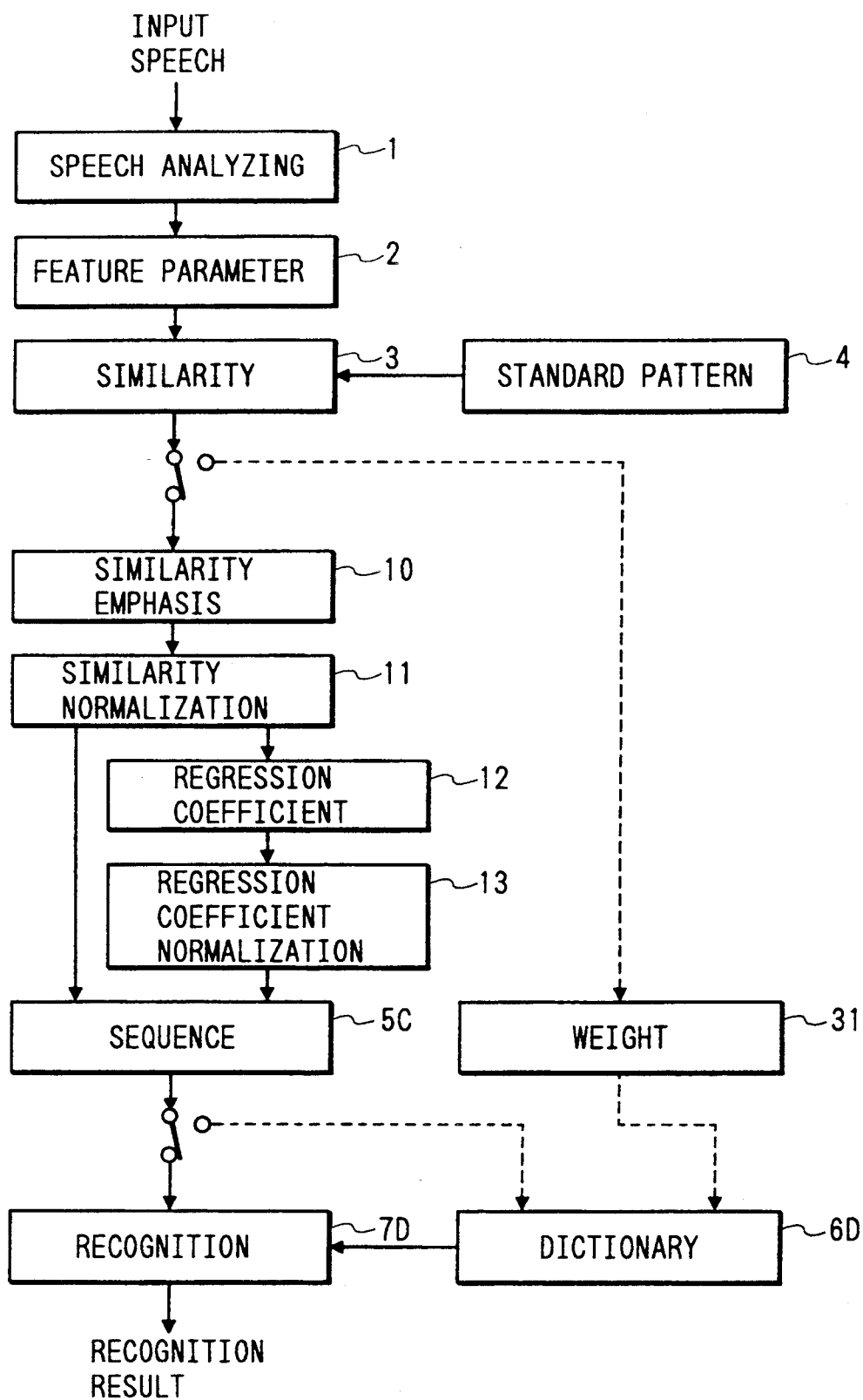
FIG. 22 is a diagram showing the flow of functions in a speech recognition method according to a twelfth embodiment of this invention.

FIG. 22 relates to a twelfth embodiment of this invention which is similar to the embodiment of FIG. 10 except for design changes indicated hereinafter.

As shown in FIG. 22, a speech recognition system includes a speech analyzing section 1, a feature parameter extracting section 2, a similarity calculating section 3, a standard pattern store section 4, a parameter sequence generating section 5C, a dictionary store section 6D, a recognition section 7D, a similarity emphasizing section 10, a similarity normalizing section 11, a regression coefficient calculating section 12, a regression coefficient normalizing section 13, and a DP weight calculating section 31. The speech analyzing section 1, the feature parameter extracting section 2, the similarity calculating section 3, the standard pattern store section 4, the parameter sequence generating section 5C, the similarity emphasizing section 10, the similarity normalizing section 11, the regression coefficient calculating section 12, and the regression coefficient normalizing section 13 are similar to those of FIG. 10. During an actual speech recognition process, the devices 1, 2, 3, 4, 5C, 10, 11, 12, and 13 operate in a manner similar to the manner of operation of the corresponding devices of FIG. 10.

The dictionary store section 6D stores a dictionary which contains reference similarity vector sequences corresponding to recognition-object words respectively, which contains reference regression coefficient vector sequences corresponding to the recognition-object words respectively, and also which contains reference DP weights $w_1$ and $w_2$. During the actual speech recognition process, the reference similarity vector sequences (also referred to as the dictionary similarity vector sequences), the reference regression coefficient vector sequences (also referred to as the dictionary regression coefficient vector sequences), and the reference DP weights $w_1$ and $w_2$ are fed from the dictionary store section 6D to the recognition section 7D. As will be explained later, the reference similarity vector sequences, the reference regression coefficient vector sequences, and the reference DP weights $w_1$ and $w_2$ are predetermined on the basis of speech data generated from a single speaker during a preliminary process which is executed before the actual speech recognition process.

Figure 23:
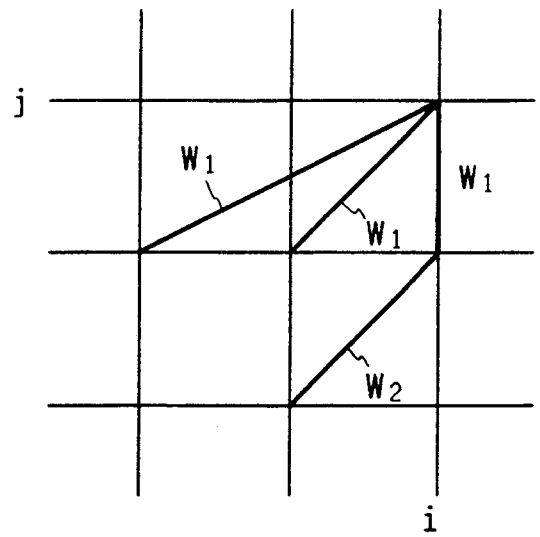
FIG. 23 is a diagram showing DP paths in the twelfth embodiment.

During the actual speech recognition process, the recognition section 7D receives an input-speech similarity vector sequence from the parameter sequence generating section 5C, and also receives an input-speech regression coefficient vector sequence from the regression coefficient normalizing section 13. The recognition section 7D executes the matching between a set of the input-speech similarity vector sequence and the input-speech regression coefficient vector sequence and sets of the reference similarity vector sequences and the reference regression coefficient vector sequences, and calculates the matching scores for the sets of the reference similarity vector sequences and the reference regression coefficient vector sequences which correspond to the recognition-object words respectively. The recognition section 7D uses the reference DP weights $w_1$ and $w_2$ in the matching so that the matching depends on the reference DP weights $w_1$ and $w_2$. The recognition section 7D selects the highest of the calculated matching scores, and decides a recognition result to be the recognition-object word corresponding to the highest matching score. Specifically, the matching calculation uses an asymmetric DP (dynamic programing) matching technique which refers to the following recurrence formula.

$$g(i,j) = \max \begin{cases} g(i-2, j-1) + w_1 l(i,j) \\ g(i-1, j-1) + w_1 l(i,j) \\ g(i-1, j-2) + w_2 l(i, j-1) + w_1 l(i,j) \end{cases} \quad (16)$$

where max denotes the operator of selecting the maximum of members following the operator character; z(i, j) denotes the function of the distance between an i-th frame of the input-speech vector sequence having a length of I flames and a j-th frame of a reference vector sequence having a length of J frames; and g(i, j) denotes the accumulative similarity related to the i-th frame of the input-speech vector sequence and the j-th frame of the reference vector sequence. The matching paths defined by the equation (16) are asymmetric as shown in FIG. 23.

In the case where a correlation cosine distance is used as a measure during the matching calculation, the distance function l(i, j) is expressed as follows.

$$l(i,j) = w_0 \frac{a \cdot b}{|a| \cdot |b|} + (1 - w_0) \frac{c \cdot d}{|c| \cdot |d|} \quad (17)$$

where "a" denotes an input-speech similarity vector in an i-th frame which is expressed as a=(a1, a2, ..., a20); "b" denotes a dictionary similarity vector in a j-th frame which is expressed as b=(b1, b2, ..., b20); "c" denotes an input-speech regression coefficient vector in an i-th frame which is expressed as c=(c1, c2, ..., c20); "d" denotes a dictionary regression coefficient vector in a j-th frame which is expressed as d=(d1, d2, ..., d20); and "w0" denotes a weight which agrees with a predetermined ratio of mixing between the similarity part and the regression coefficient part. It is preferable that the mixing ratio $w_0$ is in the range of 0.4 to 0.6. Since an input-speech similarity vector "a", a dictionary similarity vector "b", an input-speech regression coefficient vector "c", and a dictionary regression coefficient vector "d" are normalized, the absolute values $|a|$, $|b|$, $|c|$, and $|d|$ are equal to 1. Thus, the equation (17) is simplified into the following equation.

$$l(i,j) = w_0 a \cdot b + (1 - w_0) c \cdot d \quad (18)$$

The reference similarity vector sequences (the dictionary similarity vector sequences) and the reference regression coefficient vector sequences (the dictionary regression coefficient vector sequences) are predetermined on the basis of speech data generated from a single speaker during a preliminary process which is executed before an actual speech recognition process. During the preliminary process, a speaker generates pieces of speech which represent preset words (recognition-object words) respectively. The pieces of the generated speech are sequentially inputted into the speech recognition system, and the pieces of the input speech are sequentially processed in the speech recognition system. Specifically, each piece of the input speech is processed by the sections 1–4, 5C, and 10–13 of FIG. 22 in a manner similar to the manner of the processing of input speech during the actual speech recognition process. As a result, the parameter sequence generating section 5C outputs a set of the similarity vector sequence and the regression coefficient vector sequence related to the processed piece of the input speech which corresponds to one of the recognition-object words. The output similarity vector sequence and the output regression coefficient vector sequence are registered with the dictionary in the dictionary store section 6D as a reference similarity vector sequence and a reference regression coefficient vector sequence corresponding to the present recognition-object word. The parameter sequence generating section 5C also outputs sets of the similarity vector sequences and the regression coefficient vector sequences related to the other pieces of the input speech which corresponding to the remaining recognition-object words respectively. The output similarity vector sequences and the output regression coefficient vector sequences are also registered with the dictionary in the dictionary store section 6D as reference similarity vector sequences and reference regression coefficient vector sequences corresponding to the remaining recognition-object words respectively.

The reference DP weights $w_1$ and $w_2$ are predetermined by the DP weight calculating section 31 on the basis of speech data generated from a single speaker during a preliminary process which is executed before an actual speech recognition process. Since a similarity vector is normalized every frame, there is an advantage that the relative relations of the similarities in a transition from a phoneme to a phoneme with phoneme standard patterns can be handled similarly to other portions. However, since a low-similarity interval has a low reliability, a wrong recognition tends to be caused if DP matching is done with equal weights being used over the whole of the input-speech interval. The phoneme standard patterns for calculating the similarities are generated for the vowel intervals and the consonant intervals. Therefore, during a silent interval, the similarities tend to be small with respect to any of the phoneme standard patterns and are liable to be affected by noise. Thus, the similarities greatly depend on speaking conditions. Accordingly, in this embodiment, the weights to the matching scores of large-similarity intervals are set greater than the weights to the matching scores of small-similarity intervals, and thereby the accumulative similarity can be less affected by the matching scores of low-reliability intervals.

During the preliminary process, the DP weight calculating section 31 calculates a mean similarity "m" in every frame over the whole of the dictionary speech interval. The DP weight calculating section 31 receives a similarity vector from the similarity calculating section 3. The similarity vector $a_j$ of the dictionary speech in the j-th frame is now expressed as follows.

$$a_j = (a_{1,j}, a_{2,j}, \ldots, a_{20,j}) \quad (19)$$

The mean similarity "m" of the j-th frame is calculated by referring to the following equation.

$$m = (a_{1,j} + a_{2,j} + \ldots + a_{20,j})/20 \quad (20)$$

The weights $w_1$ and $w_2$ of the DP paths are calculated by using predetermined functions such as linear functions or sigmoid functions. According to a first example, the weight $w_1$ of the DP path is given by the following equations.

$$w_1 = 1 \text{ when } m \leq S1$$

$$w_1 = Am + B \text{ when } S1 < m \leq S2$$

$$w_1 = 0.5 \text{ when } m > S2 \quad (21)$$

where $A = 0.5/(S1-S2)$; $B = (0.5 \cdot S1 - S2)/(S1-S2)$; and S1 and S2 are determined on the basis of the statistical amount of the mean similarity of each frame. The weight $w_2$ of the DP path is calculated from the mean similarity "m" of the dictionary speech in the (j−1)-th frame by referring to equations similar to the equations (21).

According to a second example, the weight $w_1$ of the DP path is given by the following equations.

$$w_1 = 1 \text{ when } m \leq S$$

$$w_1 = 0.5 \text{ when } m > S \quad (22)$$

where S denotes a threshold value which is determined on the basis of the statistical mount of the mean similarity of each frame. The weight $w_2$ of the DP path is calculated from the mean similarity "m" of the dictionary speech in the (j−1)-th frame by referring to equations similar to the equations (22).

Figure 24:
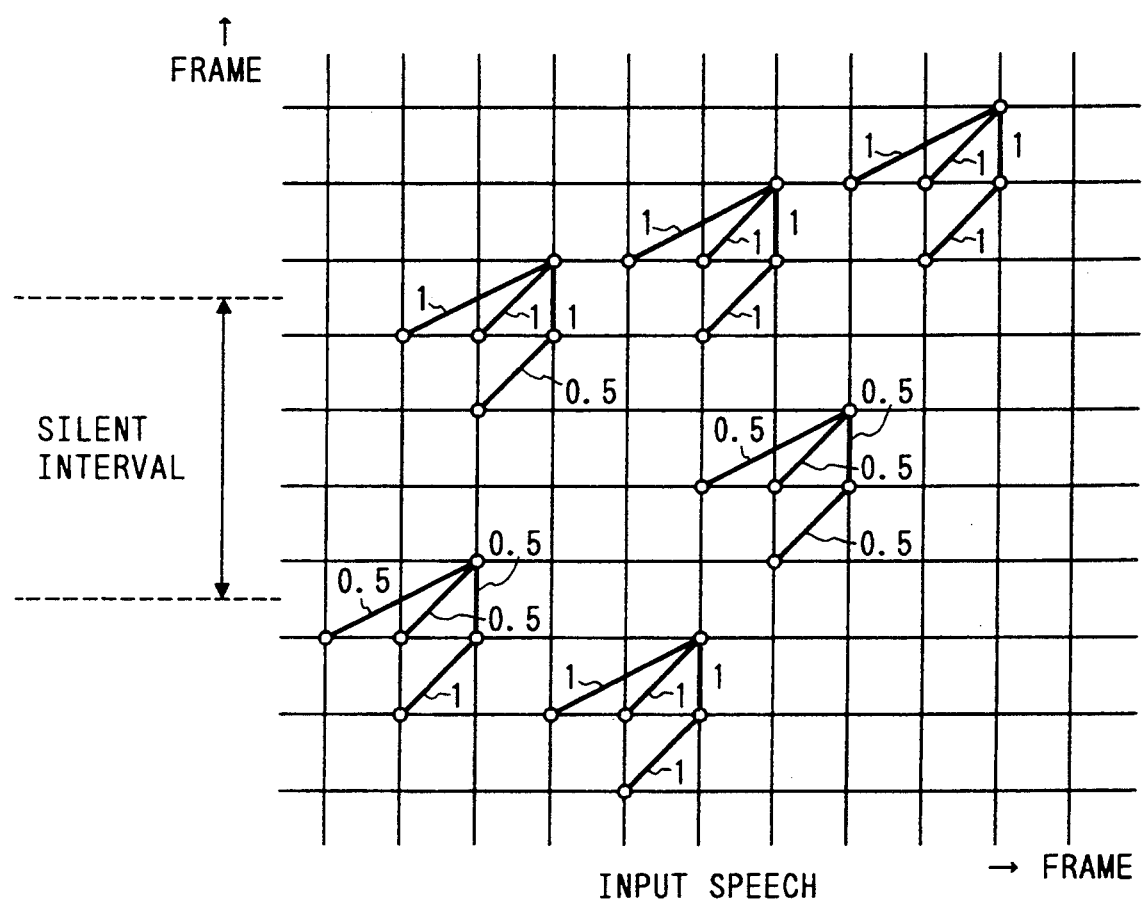
FIG. 24 is a diagram showing DP paths in the twelfth embodiment.

According to a third example, silent intervals are detected by using information of phoneme starts and ends which is contained in the speech data. During the detected silent intervals, the weights $w_1$ and $w_2$ of the DP paths are set small as shown in FIG. 24. Specifically, when the j-th frame of the dictionary speech agrees with a detected silent interval, the weight $w_1$ of the DP path is set to 0.5. When the j-th frame of the dictionary speech disagrees with a detected silent interval, the weight $w_1$ of the DP path is set to 1.0. When the j−1)-th frame of the dictionary speech agrees with a detected silent interval, the weight $w_2$ of the DP path is set to 0.5. When the (j−1)-th frame of the dictionary speech disagrees with a detected silent interval, the weight $w_2$ of the DP path is set to 1.0.

While both the similarity and the time-domain variation in the similarity are used in this embodiment, it may be good to omit the temporal variation in the similarity but use a similarity vector which is obtained through an emphasizing function and which is normalized every frame.

The reference similarity vector sequences (the dictionary similarity vector sequences) and the reference regression coefficient vector sequences (the dictionary regression coefficient vector sequences) may be determined through an averaging calculation on the basis of speech data generated from two or more speakers as in the second embodiment. In this case, the reference DP weights $w_1$ and $w_2$ are determined on the basis of the mean similarities related to one of the speakers. It is preferable that the number of male speakers and the number of female speakers are approximately equal for the generation of such dictionary information.

Experiments were done as follows. The actual speech recognition process was executed on the speech data which was generated from 20 speakers and which represented 212 different words for each speaker. In the case where the dictionary information was generated from the speech data of a single female speaker and where the weights of the DP paths were set small when the mean similarity was lower than the threshold value, good recognition results were obtained at a rate of 91.34%. In the case where the dictionary information was generated from the speech data of a single female speaker and where the weights of the DP paths were set small in the silent interval, good recognition results were obtained at a rate of 90.98%. In the case where the dictionary information was generated from the speech data of a single male speaker and a single female speaker and where the weights of the DP paths were set small when the mean similarity was lower than the threshold value, good recognition results were obtained at a rate of 93.88%. In the case where the dictionary information was generated from the speech data of a single male speaker and a single female speaker and where the weights of the DP paths were set small in the silent interval, good recognition results were obtained at a rate of 93.83%.

DESCRIPTION OF THE THIRTEENTH PREFERRED EMBODIMENT

Figure 25:
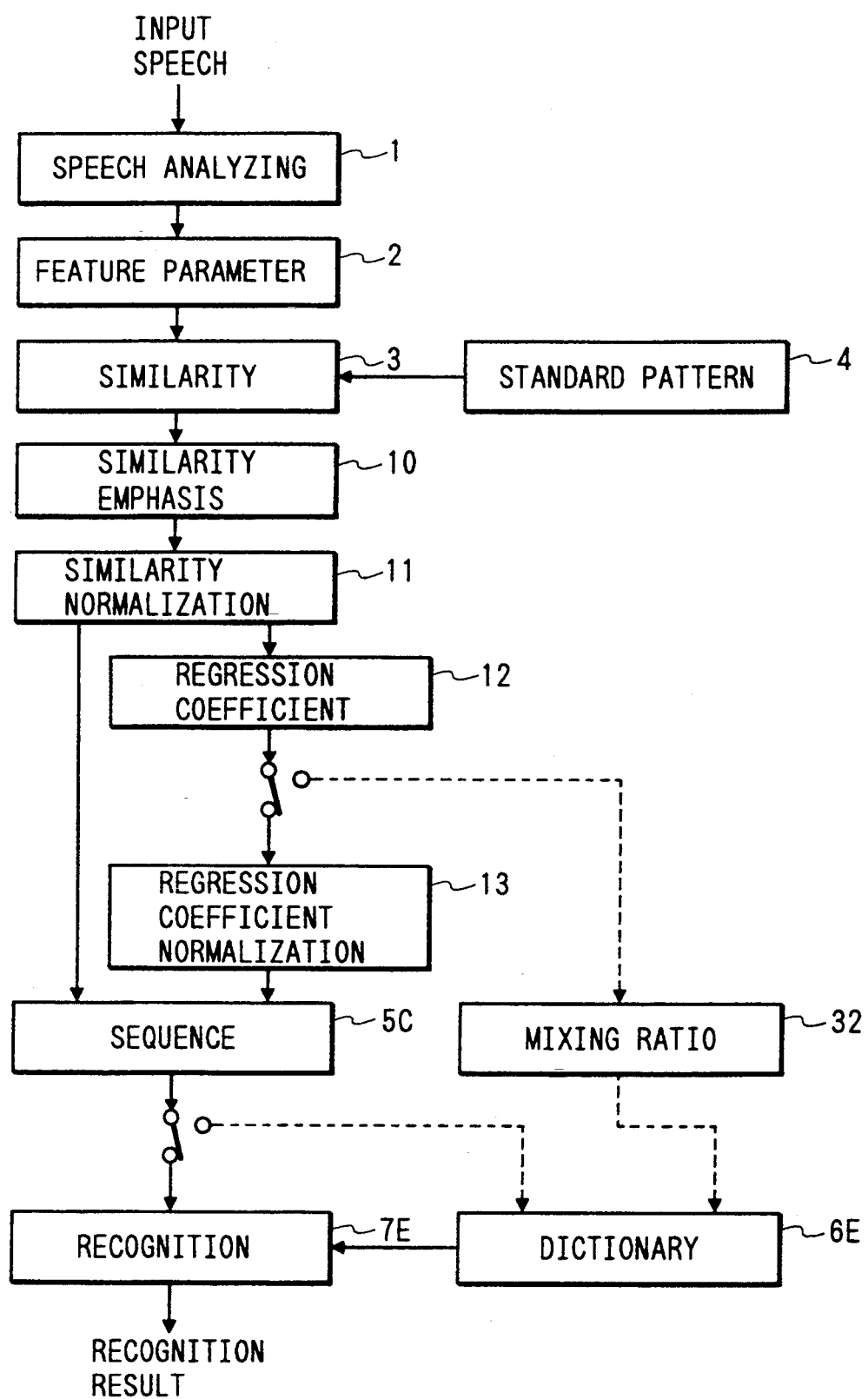
FIG. 25 is a diagram showing the flow of functions in a speech recognition method according to a thirteenth embodiment of this invention.

FIG. 25 relates to a thirteenth embodiment of this invention which is similar to the embodiment of FIG. 10 except for design changes indicated hereinafter.

As shown in FIG. 25, a speech recognition system includes a speech analyzing section 1, a feature parameter extracting section 2, a similarity calculating section 3, a standard pattern store section 4, a parameter sequence generating section 5C, a dictionary store section 6E, a recognition section 7E, a similarity emphasizing section 10, a similarity normalizing section 11, a regression coefficient calculating section 12, a regression coefficient normalizing section 13, and a mixing ratio calculating section 32. The speech analyzing section 1, the feature parameter extracting section 2, the similarity calculating section 3, the standard pattern store section 4, the parameter sequence generating section 5C, the similarity emphasizing section 10, the similarity normalizing section 11, the regression coefficient calculating section 12, and the regression coefficient normalizing section 13 are similar to those of FIG. 10. During an actual speech recognition process, the devices 2, 3, 4, 5C, 10, 11, 12, and 13 operate in a manner similar to the manner of operation of the corresponding devices of FIG. 10.

The dictionary store section 6E stores a dictionary which contains reference similarity vector sequences corresponding to recognition-object words respectively, which contains reference regression coefficient vector sequences corresponding to the recognition-object words respectively, and also which contains data of a reference weight $w_0$. During the actual speech recognition process, the reference similarity vector sequences (also referred to as the dictionary similarity vector sequences), the reference regression coefficient vector sequences (also referred to as the dictionary regression coefficient vector sequences), and the reference weight $w_0$ are fed from the dictionary store section 6E to the recognition section 7E. As will be explained later, the reference similarity vector sequences, the reference regression coefficient vector sequences, and the reference weight $w_0$ are predetermined on the basis of speech data generated from a single speaker during a preliminary process which is executed before the actual speech recognition process.

During the actual speech recognition process, the recognition section 7E receives an input-speech similarity vector sequence from the parameter sequence generating section 5C, and also receives an input-speech regression coefficient vector sequence from the regression coefficient normalizing section 13. The recognition section 7E executes the matching between a set of the input-speech similarity vector sequence and the input-speech regression coefficient vector sequence and sets of the reference similarity vector sequences and the reference regression coefficient vector sequences, and calculates the matching scores for the sets of the reference similarity vector sequences and the reference regression coefficient vector sequences which correspond to the recognition-object words respectively. The recognition section 7E uses the reference weight $w_0$ in the matching so that the matching depends on the reference weight $w_0$. The recognition section 7E selects the highest of the calculated matching scores, and decides a recognition result to be the recognition-object word corresponding to the highest matching score. Specifically, the matching calculation uses an asymmetric DP (dynamic programing) matching technique which refers to the previously-mentioned recurrence formula (16) in the embodiment of FIGS. 22–24. In the case where a correlation cosine distance is used as a measure during the matching calculation, the distance function $l(i, j)$ is expressed by the previously-mentioned equation (18) in the embodiment of FIGS. 22–24 which has terms depending on the reference weight $w_0$ corresponding to a predetermined ratio of mixing the similarity part and the regression coefficient part.

The mixing ratio calculating section 32 calculates the mixing ratio $w_0$ from a regression coefficient vector outputted by the regression coefficient calculating section 12. Since a regression coefficient represents the mean rate of a time-domain variation in similarities, the calculated mixing ratio $w_0$ depends on the mean rate of the time-domain variation in the similarities. This design is adopted in consideration of the following facts. Since a similarity vector and a regression coefficient vector are normalized to a magnitude of 1 every frame, there is an advantage that the relative relations of the similarities in a transition from a phoneme to a phoneme with phoneme standard patterns can be handled similarly to other portions. However, if a regression coefficient vector is normalized to a magnitude of 1 in a constant portion of a vowel or others which provide small absolute values of the regression coefficients, the resultant variations tend to be great so that similar relations of regression coefficients are not always obtained in equal vowel intervals. Accordingly, in this embodiment, during the calculation of the inter-frame distances in the DP matching, the distances between the similarity vectors in a constant portion of a vowel are added with using weights greater than the weights to the distances between the regression coefficient vectors.

During the preliminary process, the mixing ratio calculating section 32 calculates a time-domain variation "q" in the similarities every frame over the whole of the dictionary speech interval. The mixing ratio calculating section 32 receives a regression coefficient vector from the regression coefficient calculating section 12. The regression coefficient vector $c_j$ of the dictionary speech in the j-th frame is now expressed as follows.

$$c_j = (c_{1,j}, c_{2,j}, \ldots, c_{20,j}) \tag{23}$$

The mean regression coefficient "q" of the j-th frame is calculated by referring to the following equation.

$$q = (c_{1,j} + c_{2,j} + \ldots + c_{20,j})/20 \tag{24}$$

The mixing ratio $w_0$ is calculated by using predetermined functions such as linear functions or sigmoid functions. According to a first example, the mixing ratio $w_0$ is given by the following equations.

$$w_0 = 0.8 \text{ when } q \leq K1$$

$$w_0 = Aq + B \text{ when } K1 > q \leq K2$$

$$w_1 = 0.5 \text{ when } q > K2 \tag{25}$$

where $A = 0.3/(K1 - K2)$; $B = (0.5 \cdot K1 - 0.8 \cdot K2)/(K1 - K2)$; and K1 and K2 are determined on the basis of the statistical amount of the mean regression coefficient of each frame.

According to a second example, the mixing ratio $w_0$ is given by the following equations.

$$w_0 = 0.8 \text{ when } q \leq K$$

$$w_0 = 0.5 \text{ when } q > K \tag{26}$$

where K denotes a threshold value which is determined on the basis of the statistical amount of the mean regression coefficient of each frame.

Figure 26:
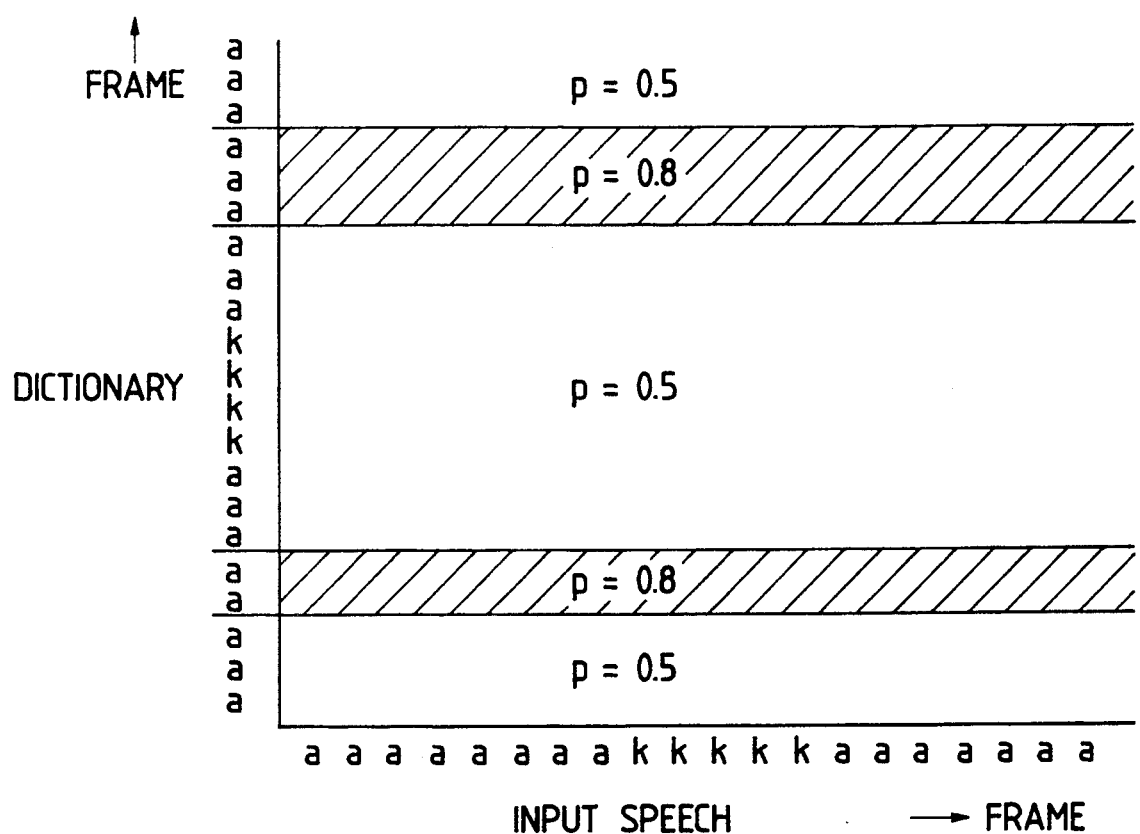
FIG. 26 is a diagram showing a change in a mixing ratio in the thirteenth embodiment.

According to a third example, intervals of the dictionary speech which correspond to constant portions of vowels are detected by using phoneme start and end information contained in the speech data. During the detected vowel constant intervals, the mixing ratio $w_0$ is set great. Specifically, when the j-th frame of the dictionary speech agrees with a detected vowel constant interval, the mixing ratio $w_0$ is set to 0.8. When the j-th frame of the dictionary speech disagrees with a detected vowel constant interval, the mixing ratio $w_0$ is set to 0.5. It is preferable that a detected vowel constant interval is limited to an interval of four or less frames starting from the frame corresponding to a start or end of the phoneme /a/, /o/, /u/, /i/, or /e/ (see the hatched regions in FIG. 26).

The reference similarity vector sequences (the dictionary similarity vector sequences), the reference regression coefficient vector sequences (the dictionary regression coefficient vector sequences), and the reference weight (the mixing ratio) $w_0$ may be determined through an averaging calculation on the basis of speech data generated from two or more speakers as in the second embodiment.

Experiments were done as follows. The actual speech recognition process was executed on the speech data which was generated from 20 speakers and which represented 212 different words for each speaker. In the case where the dictionary information was generated from the speech data of a single female speaker and where the mixing ratio was set great when the mean absolute value of the regression coefficients was lower than the threshold value, good recognition results were obtained at a rate of 90.91%. In the case where the dictionary information was generated from the speech data of a single female speaker and where the mixing ratio was set great in the vowel constant interval, good recognition results were obtained at a rate of 91.29%. In the case where the dictionary information was generated from the speech data of a single male speaker and a single female speaker and where the mixing ratio was set great when the mean absolute value of the regression coefficients was lower than the threshold value, good recognition results were obtained at a rate of 93.56%. In the case where the dictionary information was generated from the speech data of a single male speaker and a single female speaker and where the mixing ratio was set great in the vowel constant interval, good recognition results were obtained at a rate of 93.78%.

DESCRIPTION OF THE FOURTEENTH PREFERRED EMBODIMENT

Figure 27:
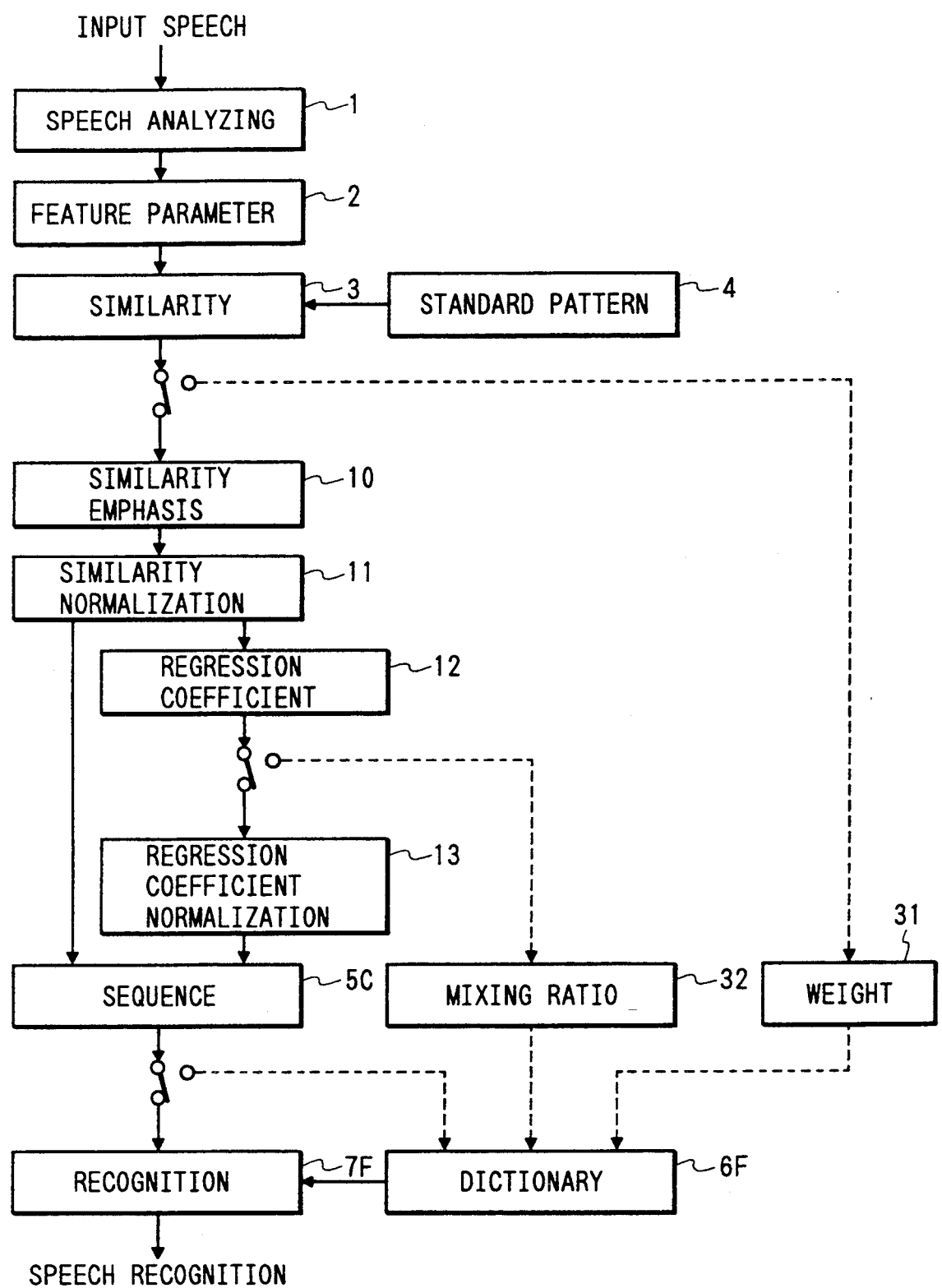
FIG. 27 is a diagram showing the flow of functions in a speech recognition method according to a fourteenth embodiment of this invention.

FIG. 27 relates to a fourteenth embodiment of this invention which is similar to the embodiment of FIGS. 22-24 except for design changes indicated hereinafter.

As shown in FIG. 27, a speech recognition system includes a speech analyzing section 1, a feature parameter extracting section 2, a similarity calculating section 3, a standard pattern store section 4, a parameter sequence generating section 5C, a dictionary store section 6D, a recognition section 7D, a similarity emphasizing section 10, a similarity normalizing section 11, a regression coefficient calculating section 12, a regression coefficient normalizing section 13, a DP weight calculating section 31, and a mixing ratio calculating section 32. The speech analyzing section 1, the feature parameter extracting section 2, the similarity calculating section 3, the standard pattern store section 4, the parameter sequence generating section 5C, the similarity emphasizing section 10, the similarity normalizing section 11, the regression coefficient calculating section 12, the regression coefficient normalizing section 13, and the DP weight calculating section 31 are similar to those of FIG. 22. During an actual speech recognition process, the devices 1, 2, 3, 4, 5C, 10, 11, 12, and 13 operate in a manner similar to the manner of operation of the corresponding devices of FIG. 22. During a preliminary process which precedes the actual speech recognition process, the DP weight calculating section 31 operates in a manner similar to the manner of operation of the corresponding device of FIG. 22.

The mixing ratio calculating section 32 is similar to the corresponding device of FIG. 25. During the preliminary process, the mixing ratio calculating section 32 operates in a manner similar to the manner of operation of the corresponding device of FIG. 25.

The dictionary store section 6F stores a dictionary which contains reference similarity vector sequences corresponding to recognition-object words respectively, which contains reference regression coefficient vector sequences corresponding to the recognition-object words respectively, which contains reference DP weights $w_1$ and $w_2$, and also which contains a mixing ratio (a reference weight) $w_0$. The reference similarity vector sequences, the reference regression coefficient vector sequences, the reference DP weights $w_1$ and $w_2$, and the mixing ratio $w_0$ are predetermined on the basis of speech data generated from a single speaker or a plurality of speakers during a preliminary process which is executed before the actual speech recognition process. The reference DP weights $w_1$ and $w_2$ are registered with the dictionary from the DP weight calculating section 31. The mixing ratio $w_0$ is registered with the dictionary from the mixing ratio calculating section 32. During the actual speech recognition process, the reference similarity vector sequences (also referred to as the dictionary similarity vector sequences), the reference regression coefficient vector sequences (also referred to as the dictionary regression coefficient vector sequences), the reference DP weights $w_1$ and $w_2$, and the mixing ratio $w_0$ are fed from the dictionary store section 6F to the recognition section 7F.

During the actual speech recognition process, the recognition section 7F receives an input-speech similarity vector sequence from the parameter sequence generating section 5C, and also receives an input-speech regression coefficient vector sequence from the regression coefficient normalizing section 13. The recognition section 7F executes the matching between a set of the input-speech similarity vector sequence and the input-speech regression coefficient vector sequence and sets of the reference similarity vector sequences and the reference regression coefficient vector sequences, and calculates the matching scores for the sets of the reference similarity vector sequences and the reference regression coefficient vector sequences which correspond to the recognition-object words respectively. The recognition section 7F uses the reference DP weights $w_1$ and $w_2$ in the matching as in the embodiment of FIGS. 22-24 so that the matching depends on the reference DP weights $w_1$ and $w_2$. In addition, the recognition section 7F uses the mixing ratio $w_0$ in the matching as in the embodiment of FIGS. 25 and 26 so that the matching depends on the mixing ratio $w_0$. The recognition section 7F selects the highest of the calculated matching scores, and decides a recognition result to be the recognition-object word corresponding to the highest matching score. Specifically, the matching calculation uses an asymmetric DP (dynamic programing) matching technique as in the embodiment of FIGS. 22-24 and the embodiment of FIGS. 25 and 26.

Experiments were done as follows. The actual speech recognition process was executed on the speech data which was generated from 20 speakers and which represented 212 different words for each speaker. In the case where the dictionary information was generated from the speech data of a single female speaker and where the weights of the DP paths were set small in the silent interval and the mixing ratio was set great in the vowel constant interval, good recognition results were obtained at a rate of 92.42%. In the case where the dictionary information was generated from the speech data of a single male speaker and a single female speaker and where the weights of the DP paths were set small in the silent interval and the mixing ratio was set great in the vowel constant interval, good recognition results were obtained at a rate of 94.40%.

What is claimed is:

1. A method of speech recognition, comprising the steps of:

generating "m" feature parameters every frame from reference speech which is spoken by at least one speaker and which represents recognition-object words, where "m" denotes a preset integer;

previously generating "n" types of standard patterns of a set of preset phonemes on the basis of speech data of a plurality of speakers, where "n" denotes a preset integer;

executing a matching between the feature parameters of the reference speech and each of the standard patterns, and generating a vector of "n" reference similarities between the feature parameters of the reference speech and each of the standard patterns every frame;

generating temporal sequences of the reference similarity vectors of respective frames, the reference similarity vector sequences corresponding to the recognition-object words respectively;

previously registering the reference similarity vector sequences as dictionary similarity vector sequences;

analyzing input speech to be recognized, and generating "m" feature parameters from the input speech;

executing a matching between the feature parameters of the input speech and the standard patterns, and generating a vector of "n" input-speech similarities between the feature parameters of the input speech and the standard patterns every frame;

generating a temporal sequence of the input-speech similarity vectors of respective frames;

collating the input-speech similarity vector sequence with the dictionary similarity-vector sequences; and recognizing the input speech based on a result of the collating step.

2. The method of claim 1, further comprising the steps of calculating time-domain variations in the reference similarities every frame, generating vectors of the time-domain variations in the reference similarities every frame, generating temporal sequences of the vectors of the time-domain variations in the reference similarities of respective frames, wherein the temporal sequences of the vectors of the time-domain variations in the reference similarities correspond to the recognition-object words respectively, calculating time-domain variations in the input-speech similarities, generating a vector of the time-domain variations in the input-speech similarities every frame, generating a temporal sequence of the vectors of the time-domain variations in the input-speech similarities of respective frames, and collating the temporal sequence of the vectors of the time-domain variations in the input-speech similarities with each of the temporal sequences of the vectors of the time-domain variations in the reference similarities to recognize the input speech.

3. The method of claim 2, further comprising the steps of analyzing pieces of reference speech which are spoken by at least two speakers and which represent equal recognition-object words to obtain similarity vector sequences and time-domain similarity variation vector sequences, using the similarity vector sequences and the time-domain similarity variation vector sequences as multi standard patterns in determining the reference similarity vector sequences and the reference time-domain similarity variation vector sequences.

4. The method of claim 3, wherein the pieces of the reference speech are spoken by a male speaker and a female speaker.

5. The method of claim 2, wherein two or more speakers speak equal recognition-object words, which are analyzed to obtain temporal sequence patterns of similarity vectors and temporal sequence patterns of regression coefficient vectors, wherein time bases of the speakers are matched by a DP matching with respect to the temporal sequence patterns of the similarity vectors and the temporal sequence patterns of the regression coefficient vectors, wherein mean values of the similarities and mean values of time-domain variations in the similarities are calculated between temporally-matched frames, and wherein temporal sequence patterns of the mean values are registered with a dictionary.

6. The method of claim 1, wherein the collating step uses a dynamic programming matching technique.

7. The method of claim 1, further comprising the step of processing the reference similarities and the input-speech similarities through a function of emphasizing large members of the similarities.

8. The method of claim 1, further comprising the steps of processing the reference similarities through a function of emphasizing large members of the reference similarities to convert the reference similarities into second reference similarities, processing the input-speech similarities through the same function to convert the input-speech similarities into second input-speech similarities, determining the dictionary similarity vector sequences on the basis of the second reference similarities, calculating time-domain variations in the second reference similarities every frame generating vectors of the time-domain variations in the second reference similarities every frame, generating temporal sequences of the vectors of the time-domain variations in the second reference similarities of respective frames, wherein the temporal sequences of the vectors of the time-domain variations in the second reference similarities correspond to the recognition-object words respectively, calculating time-domain variations in the second input-speech similarities, generating a vector of the time-domain variations in the second input-speech similarities every frame, generating a temporal sequence of the vectors of the time-domain variations in the second input-speech similarities of respective frames, and collating the temporal sequence of the vectors of the time-domain variations in the second input-speech similarities with each of the temporal sequences of the vectors of the time-domain variations in the second reference similarities to recognize the input speech.

9. The method of claim 1, further comprising the steps of normalizing each of the reference similarity vectors, and normalizing each of the input-speech similarity vectors, and wherein the collating step comprises calculating a distance between the input-speech similarity vector sequence and each of the dictionary similarity vector sequences, and recognizing the input speech in response to the calculated distances.

10. The method of claim 1, further comprising the steps of selecting "k" greater members from the reference similarities and setting remaining members of the reference similarities equal to a k-th greatest reference similarity to convert the reference similarities into second reference similarities, where "k" denotes a preset integer, determining the dictionary similarity vector sequences on the basis of the second reference similarities, selecting "k" greater members from the input similarities and setting remaining members of the input-speech similarities equal to a k-th greatest input similarity to convert the input similarities into second input-speech similarities, determining the input-speech similarity vector sequence on the basis of the second input-speech similarities, and wherein the collating step comprises calculating an Euclidean distance between the input-speech similarity vector sequence and each of the dictionary similarity vector sequences, and recognizing the input speech in response to the calculated Euclidean distances.

11. The method of claim 1, further comprising the step of processing the reference similarities and the input-speech similarities through an exponential function of emphasizing large members of the similarities, and wherein the collating step comprises calculating a correlation distance between the input-speech similarity vector sequence and each of the dictionary similarity vector sequences, and recognizing the input speech in response to the calculated correlation distances.

12. The method of claim 1, further comprising the steps of emphasizing great members of the reference similarities to convert the reference similarities into second reference similarities, determining the dictionary similarity vector sequences on the basis of the second reference similarities, normalizing each of the dictionary similarity vectors, emphasizing great members of the input-speech similarities to convert the input-speech similarities into second input-speech similarities, determining the input-speech similarity vector sequence on the basis of the second input-speech similarities, normalizing each of the input-speech vectors, and wherein the collating step comprises executing a DP matching technique using a weight, varying the weight in accordance with a magnitude of a mean similarity in a frame to set the weight small in an interval corresponding to a low mean similarity.

13. The method of claim 12, further comprising the steps of calculating time-domain variations in the second reference similarities every frame, generating vectors of the time-domain variations in tile second reference similarities every frame, generating temporal sequences of the vectors of the time-domain variations in the second reference similarities of respective frames, wherein the temporal sequences of the vectors of the time-domain variations in the second reference similarities correspond to the recognition-object words respectively, calculating time-domain variations in the second input-speech similarities, generating a vector of the time-domain variations in the second input-speech similarities every frame, generating a temporal sequence of the vectors of the time-domain variations in the second input-speech similarities of respective frames, and collating the temporal sequence of the vectors of the time-domain variations in the second input-speech similarities with each of the temporal sequences of the vectors of the time-domain variations in the second reference similarities to recognize the input speech.

14. The method of claim 1, wherein the collating step comprises executing a DP matching technique using a weight, and setting the weight small in a silent interval.

15. The method of claim 1, further comprising the steps of emphasizing great members of the reference similarities to convert the reference similarities into second reference similarities, determining the dictionary similarity vector sequences on the basis of the second reference similarities, normalizing each of the dictionary similarity vectors, emphasizing great members of the input-speech similarities to convert the input-speech similarities into second input-speech similarities, determining the input-speech similarity vector sequence on the basis of the second input-speech similarities, normalizing each of the input-speech vectors, calculating time-domain variations in the second reference similarities every frame, generating vectors of the time-domain variations in the second reference similarities every frame, generating temporal sequences of the vectors of the time-domain variations in the second reference similarities of respective frames, wherein the temporal sequences of the vectors of the time-domain variations in the second reference similarities correspond to the recognition-object words respectively, calculating time-domain variations in the second input-speech similarities, generating a vector of the time-domain variations in the second input-speech similarities every frame, generating a temporal sequence of the vectors of the time-domain variations in the second input-speech similarities of respective frames, and wherein the collating means comprises executing a DP matching technique, calculating a distance Lk between the temporal sequence of the vectors of the time-domain variations in the second input-speech similarities and each of the temporal sequences of the vectors of the time-domain variations in the second reference similarities, calculating a distance Ls between the the input-speech similarity vector sequence and each of the dictionary similarity vector sequences, calculating a weighted addition L between the distances Lk and Ls by referring to an equation "L=pLs+(1−p)Lk" where "p" denotes a weight corresponding to a mixing ratio, varying the talking ratio "p" in accordance with a magnitude of a mean time-domain variation in the similarities in a frame to set the mixing ratio "p" great in an interval corresponding to a small mean time-domain variation in the similarities in a frame, and recognizing the input speech in response to the weighted addition L.

16. The method of claim 1, further comprising the steps of emphasizing great members of the reference similarities to convert the reference similarities into second reference similarities, determining the dictionary similarity vector sequences on the basis of the second reference similarities, normalizing each of the dictionary similarity vectors, emphasizing great members of the input-speech similarities to convert the input-speech similarities into second input-speech similarities, determining the input-speech similarity vector sequence on the basis of the second input-speech similarities, normalizing each of the input-speech vectors, calculating time-domain variations in the second reference similarities every frame, generating vectors of the time-domain variations in the second reference similarities every frame, generating temporal sequences of the vectors of the time-domain variations in the second reference similarities of respective frames, wherein the temporal sequences of the vectors of the time-domain variations in the second reference similarities correspond to the recognition-object words respectively, calculating time-domain variations in the second input-speech similarities, generating a vector of the time-domain variations in the second input-speech similarities every frame, generating a temporal sequence of the vectors of the time-domain variations in the second input-speech similarities of respective frames, and wherein the collating means comprises executing a DP matching technique, calculating a distance Lk between the temporal sequence of the vectors of the time-domain variations in the second input-speech similarities and each of the temporal sequences of the vectors of the time-domain variations in the second reference similarities, calculating a distance Ls between the the input-speech similarity vector sequence and each of the dictionary similarity vector sequences, calculating a weighted addition L between the distances Lk and Ls by referring to an equation "L=pLs+(1−p)Lk" where "p" denotes a weight corresponding to a mixing ratio, setting the mixing ratio "p" to a first reference value in an interval corresponding to a constant portion of a vowel, setting the mixing ratio "p" to a second reference value in an interval different from the interval corresponding to the constant portion of the vowel, the second reference value being smaller than the first reference value, and recognizing the input speech in response to the weighted addition L.

17. The method of claim 1, further comprising the steps of emphasizing great members of the reference similarities to convert the reference similarities into second reference similarities, determining the dictionary similarity vector sequences on the basis of the second reference similarities, normalizing each of the dictionary similarity vectors, emphasizing great members of the input-speech similarities to convert the input-speech similarities into second input-speech similarities, determining the input-speech similarity vector sequence on the basis of the second input-speech similarities, normalizing each of the input-speech vectors, calculating time-domain variations in the second reference similarities every frame, generating vectors of the time-domain variations in the second reference similarities every frame, generating temporal sequences of the vectors of the time-domain variations in the second reference similarities of respective frames, wherein the temporal sequences of the vectors of the time-domain variations in the second reference similarities correspond to the recognition-object words respectively, calculating time-domain variations in the second input-speech similarities, generating a vector of the time-domain variations in the second input-speech similarities every frame, generating a temporal sequence of the vectors of the time-domain variations in the second input-speech similarities of respective flames, and wherein the collating means comprises executing a DP matching technique, calculating a distance Lk between the temporal sequence of the vectors of the time-domain variations in the second input-speech similarities and each of the temporal sequences of the vectors of the time-domain variations in the second reference similarities, calculating a distance Ls between the the input-speech similarity vector sequence and each of the dictionary similarity vector sequences, calculating a weighted addition L between the distances Lk and Ls by referring to an equation "L=pLs+(1−p)Lk" where "p"60 denotes a weight corresponding to a mixing ratio, varying the mixing ratio "p" in accordance with a magnitude of a mean time-domain variation in the similarities in a frame to set the mixing ratio "p" great in an interval corresponding to a small mean time-domain variation in the similarities in a frame, executing a DP matching technique in calculating the distances Lk and Ls, the DP matching technique using a second weight, setting the second weight small in a silent interval, and recognizing the input speech in response to the weighted addition L.

18. The method of claim 1, further comprising the steps of analyzing pieces of reference speech which are spoken by at least two speakers and which represent equal recognition-object words to obtain temporal sequences of similarity vectors, executing a DP matching on the temporal sequences of the similarity vectors to match time bases between the speakers, calculating mean values of respective similarities between temporally-matched frames, and determining the reference similarity vector sequences on the basis of the calculated mean values.

19. The method of claim 18, wherein the pieces of the reference speech are spoken by a male speaker and a female speaker.

20. The method of claim 1, further comprising the steps of calculating time-domain variations in the reference similarities every frame, generating vectors of the time-domain variations in the reference similarities every frame, generating temporal sequences of the vectors of the time-domain variations in the reference similarities of respective frames, wherein the temporal sequences of the vectors of the time-domain variations in the reference similarities correspond to the recognition-object words respectively, calculating time-domain variations in the input-speech similarities, generating a vector of the time-domain variations in the input-speech similarities every frame, generating a temporal sequence of the vectors of the time-domain variations in the input-speech similarities of respective frames, collating the temporal sequence of the vectors of the time-domain variations in the input-speech similarities with each of the temporal sequences of the vectors of the time-domain variations in the reference similarities to recognize the input speech, analyzing pieces of reference speech which are spoken by at least two speakers and which represent equal recognition-object words to obtain temporal sequences of similarity vectors and temporal sequences of time-domain similarity variations, executing a DP matching on the temporal sequences of the similarity vectors and the temporal sequences of the time-domain similarity variations to match time bases between the speakers, calculating mean values of respective similarities between temporally-matched frames, and determining the reference similarity vector sequences and the reference time-domain similarity variation sequences on the basis of the calculated mean values.

21. The method of claim 20, wherein the pieces of the reference speech are spoken by a male speaker and a female speaker.

22. The method of claim 1, further comprising the steps of analyzing pieces of reference speech which are spoken by at least two speakers and which represent equal recognition-object words to obtain similarity vectors, using the similarity vectors as multi standard patterns in determining the reference similarity vector sequences.

23. The method of claim 22, wherein the pieces of the reference speech are spoken by a male speaker and a female speaker.

24. A method of speech recognition, comprising the steps of:
   previously setting a set of words in consideration of phonetic environments;

making at least one speaker speak the word set, and obtaining "m" feature parameters therefrom every frame;

previously generating "n" types of standard patterns of a set of preset phonemes from speech data generated by many speakers;

executing a matching between the feature parameters and each of the standard patterns to obtain a vector of "n" similarities every frame;

generating a temporal sequence pattern from the similarity vector;

extracting speech fragments from the temporal sequence pattern, and registering the speech fragments as a speech fragment dictionary;

generating a connection sequence of the speech fragments or a temporal sequence pattern of similarity vectors for each of speech-recognition object words, wherein the temporal sequence pattern of the similarity vectors is made by combining the speech fragments in the speech fragment dictionary;

storing the connection sequence of the speech fragments or the temporal sequence pattern of the similarity vectors into a recognition-object dictionary for each of the recognition-object words;

analyzing input speech to obtain "m" feature parameter every frame;

executing a matching between the input-speech feature parameters and each of the standard patterns to obtain a temporal sequence of vectors of "n" similarities;

performing one of a first and second collating steps, wherein said first collating step comprises collating the input-speech temporal similarity vector sequence with each of the temporal sequence patterns of the similarities which are registered in respective items of the recognition-object dictionary and said second collating step comprises collating the input-speech temporal similarity vector sequence with each of the temporal sequence patterns of the similarities which are generated according to the connection sequences of the speech fragments, and recognizing the input speech based on a result of the collating step as performed.

25. The method of claim 27, wherein said calculating step comprises the step of using regression coefficients as information of similarity time-domain variations.

26. The method of claim 27, wherein two or more speakers speak equal recognition-object words, which are analyzed to obtain temporal sequence patterns of similarity vectors and temporal sequence patterns of regression coefficient vectors, time bases of the speakers are matched by a DP matching with respect to the temporal sequence patterns of the similarity vectors and the temporal sequence patterns of the regression coefficient vectors, mean values of the similarities and mean values of time-domain variations in the similarities are calculated between temporally-matched frames, speech fragments are extracted from a temporal sequence pattern of the mean values, and the speech fragments are registered with the speech fragment dictionary.

27. The method of claim 24, further comprising the steps of calculating "n" time-domain variations in the similarities with respect to each of the temporal sequences of the "n" types of the similarities every frame, and generating the temporal sequence patterns from a vector of the "n" time-domain variations in the similarities and a vector of the "n" similarities.

28. The method of claim 24, wherein the speech fragments comprise a sequence of a consonant and a vowel and a combination of a vowel and a consonant.

29. The method of claim 24, wherein each of the items of the recognition-object words is generated by connecting the temporal sequence patterns of the time-domain similarity variation vectors or the temporal sequence patterns of the similarity vectors extracted as speech fragment patterns, and a DP matching is done with respect to the input speech to recognize the input speech.

30. The method of claim 24, wherein hidden Markov models are applied to the temporal sequence patterns of the time-domain similarity variation vectors or the temporal sequence patterns of the similarity vectors extracted as speech fragment patterns to recognize the input speech.

31. The method of claim 24, wherein two or more speakers speak equal recognition-object words, which are analyzed to obtain temporal sequence patterns of similarity vectors, time bases of the speakers are matched by a DP matching with respect to the temporal sequence patterns of the similarity vectors, mean values of the similarities are calculated between temporally-matched frames, speech fragments are extracted from a temporal sequence pattern of the mean values, and the speech fragments are registered with the speech fragment dictionary.

32. The method of claim 24, wherein said step of performing one of said first and second collating step comprises the step of using one of an Euclidean distance, a weighted Euclidean distance, and a correlation cosine as a distance measure for a step of calculating a distance between the similarity vectors.

33. The method of claim 24, wherein at least one of said steps of executing a matching between feature parameters and standard patterns comprises the step of using one of a Bayesian decision distance, a Maharanobis's distance, a Maharanobis's distance in which covariance matrixes of the standard patterns are used in common, a neural-network distance, a hidden Markov model distance, and a learning vector quantization distance as a distance measure with respect to the standard patterns.

34. A method of speech recognition, comprising the steps of:

extracting feature parameters from input speech representing one of preset words;

calculating a set of input-speech similarities between the input-speech feature parameters and standard patterns of a set of preset phonemes;

collating the set of the input-speech similarities with sets of predetermined reference similarities which correspond to the preset words respectively; and recognizing the input speech based on a result of said collating step.

35. A method of speech recognition, comprising the steps of:

extracting feature parameters from input speech representing one of preset words;

calculating a set of input-speech similarities between the input-speech feature parameters and standard patterns of a set of preset phonemes;

calculating a set of time-domain variations in the input-speech similarities;

collating the set of the input-speech similarities with sets of predetermined reference similarities which correspond to the preset words respectively; and collating the set of the time-domain variations in the input-speech similarities with sets of predetermined reference time-domain variations which correspond to the preset words respectively; and recognizing the input speech based on results of said two collating steps.

* * * * *